US012524770B2

(12) United States Patent
Boston et al.

(10) Patent No.: US 12,524,770 B2
(45) Date of Patent: Jan. 13, 2026

(54) MANAGEMENT OF QUEUED APPOINTMENT WORKFLOW USING ROBOTIC PROCESS AUTOMATION AND TEMPLATE-BASED DOCUMENTS

(71) Applicant: The Toronto-Dominion Bank, Toronto (CA)

(72) Inventors: Erin Boston, Kitchener (CA); Roger Christopher Bruggeman, London (CA)

( * ) Notice: Subject to any disclaimer, the term of this patent is extended or adjusted under 35 U.S.C. 154(b) by 560 days.

(21) Appl. No.: 16/860,295

(22) Filed: Apr. 28, 2020

(65) Prior Publication Data

US 2021/0334817 A1    Oct. 28, 2021

(51) Int. Cl.
*G06Q 30/016*    (2023.01)
*G06F 9/455*    (2018.01)
*G06Q 10/1093*    (2023.01)
*G06Q 40/02*    (2023.01)
*H04L 9/40*    (2022.01)

(52) U.S. Cl.
CPC ....... *G06Q 30/016* (2013.01); *G06F 9/45558* (2013.01); *G06Q 10/1095* (2013.01); *G06Q 40/02* (2013.01); *H04L 63/0442* (2013.01); *G06F 2009/45562* (2013.01); *G06Q 2220/10* (2013.01)

(58) Field of Classification Search
None
See application file for complete search history.

(56) References Cited

U.S. PATENT DOCUMENTS 8,185,426 B1 *   5/2012   Khoubyari ..... G06Q 10/063116
                                                             705/2
8,219,502 B2     7/2012   Gold
(Continued)

FOREIGN PATENT DOCUMENTS

KR    20180000280 A  *  2/2018

OTHER PUBLICATIONS

Cisco Virtual Managed Services (VMS) Solution Overview Guide (2018) (https://www.cisco.com/c/en/US/td/docs/net_mgmt/vMS/3_2/solution_overview/Cisco_VMS_Sol_Overview.pdf) (Year: 2018).*

*Primary Examiner* — Sujay Koneru
(74) *Attorney, Agent, or Firm* — NIXON PEABODY LLP

(57) ABSTRACT

The disclosed embodiments include computer-implemented processes that manage adaptively queued appointment workflow through a virtualization of robotic process automation (RPA) techniques and an implementation of template-based document generation processes. An apparatus may obtain an element of appointment data that includes a customer identifier. The appointment data may include information generated during a chatbot session. The apparatus may implement one or more virtualized RPA techniques to (i) access a graphical interface of an application program executed by a first computing system, and (ii) request, through the accessed graphical interface, data associated with the customer identifier. Based on appointment-specific elements of template data, the apparatus may generate a portion of a guidance document for a corresponding appointment that includes at least a portion of the requested, and received, data associated with the customer identifier, and the apparatus may transmit the guidance document to a second computing system associated with the corresponding appointment.

22 Claims, 13 Drawing Sheets

(56) References Cited

U.S. PATENT DOCUMENTS

| | | | |
|---|---|---|---|
| 9,189,742 B2* | 11/2015 | London | G06N 7/005 |
| 9,325,688 B1* | 4/2016 | Hansen | H04L 63/08 |
| 9,779,386 B2 | 10/2017 | Swierz, III | |
| 9,934,213 B1* | 4/2018 | Dutt | G06Q 20/102 |
| 10,298,757 B2 | 5/2019 | Li | |
| 10,437,984 B2 | 10/2019 | Votaw | |
| 10,956,659 B1* | 3/2021 | Wexler | G06F 40/284 |
| 2003/0036941 A1* | 2/2003 | Leska | G06Q 10/109 705/7.19 |
| 2004/0204964 A1* | 10/2004 | Moore | G06Q 10/1095 705/2 |
| 2007/0089048 A1* | 4/2007 | Lacey | G06F 9/451 715/256 |
| 2007/0129967 A1* | 6/2007 | Thompson | G16H 10/60 705/2 |
| 2008/0126244 A1* | 5/2008 | Loving | G06Q 40/02 705/38 |
| 2009/0125358 A1* | 5/2009 | Reynard | G06Q 10/1095 705/7.19 |
| 2012/0253868 A1* | 10/2012 | Ach | G06Q 10/06 705/7.12 |
| 2013/0173281 A1 | 7/2013 | Rosow et al. | |
| 2013/0226645 A1 | 8/2013 | Renaghan | |
| 2013/0232463 A1* | 9/2013 | Nagaraja | G06F 8/70 717/101 |
| 2014/0114706 A1 | 4/2014 | Blakely | |
| 2014/0215058 A1* | 7/2014 | Vicat-Blanc | H04L 43/14 709/224 |
| 2016/0253462 A1* | 9/2016 | Zhong | G16H 40/20 705/2 |
| 2016/0350721 A1 | 12/2016 | Comerford | |
| 2018/0053007 A1 | 2/2018 | Alexander | |
| 2018/0197123 A1 | 7/2018 | Parimelazhagan | |
| 2019/0082052 A1* | 3/2019 | Hardy | G06F 9/453 |
| 2019/0109915 A1* | 4/2019 | McPhee | H04L 51/224 |
| 2019/0155225 A1 | 5/2019 | Kothandaraman | |
| 2019/0180249 A1* | 6/2019 | Connolly | H04L 51/046 |
| 2019/0180385 A1* | 6/2019 | Stoddard | G06Q 40/125 |
| 2019/0244149 A1 | 8/2019 | Krishnaswamy | |
| 2019/0286474 A1 | 9/2019 | Sturtivant | |
| 2019/0286736 A1 | 9/2019 | Sturtivant | |
| 2019/0303232 A1 | 10/2019 | Antonio | |
| 2020/0090132 A1* | 3/2020 | Bender | G06F 16/337 |
| 2020/0097557 A1* | 3/2020 | Houlette | G06F 16/338 |
| 2020/0311827 A1* | 10/2020 | Kramer | G06F 16/9536 |
| 2020/0359210 A1* | 11/2020 | Akkad | G06Q 40/02 |
| 2021/0110912 A1* | 4/2021 | Mukherjee | G06F 40/253 |

* cited by examiner

544

Branch Identifier CA123456   514

GUIDANCE DOCUMENT

Re:       Appointment for Mortgage Lending Services for John Q. Stone

Appt. Time:   April 30, 2020, at 9:00 a.m. EDT

The Guidance Document identifies elements of customer profile data, customer account data, and customer reporting data that inform the scheduled appointment for mortgage lending services.

i. Customer Profile Data   516

The customer's full name and address are:

John Q. Stone
505 9th Street N.W.
Washington, D.C. 20005 ii. Customer Account Data   518

The customer holds the following accounts:

CHECKING:      Account No. XXXXXX7809;      balance = $13,275.35    — 518A
CREDIT CARD:   Account No. XXXX-XXXXXX-01234;   balance = $6,682.34    — 518B iii. Customer Reporting Data   520

The customer's current credit score is 758.

FIG. 5C

MANAGEMENT OF QUEUED APPOINTMENT WORKFLOW USING ROBOTIC PROCESS AUTOMATION AND TEMPLATE-BASED DOCUMENTS

TECHNICAL FIELD

The disclosed embodiments generally relate to computer-implemented systems and processes that manage queued appointment workflow using robotic process automation.

BACKGROUND

Modern financial institutions selectively provision a variety of financial services to their customers. For example, on a daily basis, a single branch of a financial institution may conduct appointments with dozens of customers regarding financial services that include, but are not limited to, applications for loans or lines of credit, investment services, and retirement, estate, or tax planning. Indeed, a large financial institution may conduct thousands of such appointments on a daily basis, and the provisioning of financial services during each of these appointments may be informed by an accurate and timely understanding of each customer's financial position and goals, and of the interactions between each customer and not only the financial institution, but also with other financial institutions, governmental or judicial entities, and reporting agencies.

SUMMARY

In some examples, an apparatus includes a memory storing instructions, a communications interface, and at least one processor coupled to the communications interface and the memory. The at least one processor is configured to execute the instructions to obtain an element of appointment data associated with an appointment. The element of appointment data includes a customer identifier. The at least one processor is further configured to, via the communications interface, perform operations that (i) access a graphical interface of an application program executed by a first computing system, and (ii) request, through the accessed graphical interface, first data associated with the customer identifier. The at least one processor is further configured to receive the first data from the first computing system via the communications interface, and generate a guidance document that includes at least a portion of the first data. The guidance document is generated in accordance with template data associated with the appointment. The at least one processor is further configured to transmit, via the communications interface, the guidance document to a second computing system associated with the appointment.

In other examples, a computer-implemented method includes obtaining, using at least one processor, an element of appointment data associated with an appointment. The element of appointment data includes a customer identifier. The computer-implemented also includes, using the at least one processor, performing operations that (i) access a graphical interface of an application program executed by a first computing system, and (ii) request, through the accessed graphical interface, first data associated with the customer identifier. The computer-implemented method further includes, using the at least one processor, receiving the first data from the first computing system via a communications interface, and generating a guidance document that includes at least a portion of the first data. The guidance document is generated in accordance with template data associated with the appointment. The computer-implemented method also includes transmitting, using the at least one processor, the guidance document to a second computing system associated with the appointment.

Additionally, in some examples, a tangible, non-transitory computer-readable medium stores instructions that, when executed by at least one processor, cause the at least one processor to perform a method. The method incudes obtaining an element of appointment data associated with an appointment. The element of appointment data includes a customer identifier. The method also includes performing operations that (i) access a graphical interface of an application program executed by a first computing system, and (ii) request, through the accessed graphical interface, first data associated with the customer identifier. The method further includes receiving the first data from the first computing system via a communications interface, and generating a guidance document that includes at least a portion of the first data. The guidance document is generated in accordance with template data associated with the appointment. The method also includes transmitting the guidance document to a second computing system associated with the appointment.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 5C is an exemplary appointment guidance document, in accordance with some exemplary embodiments.

Like reference numbers and designations in the various drawings indicate like elements.

DETAILED DESCRIPTION

Figure 1:
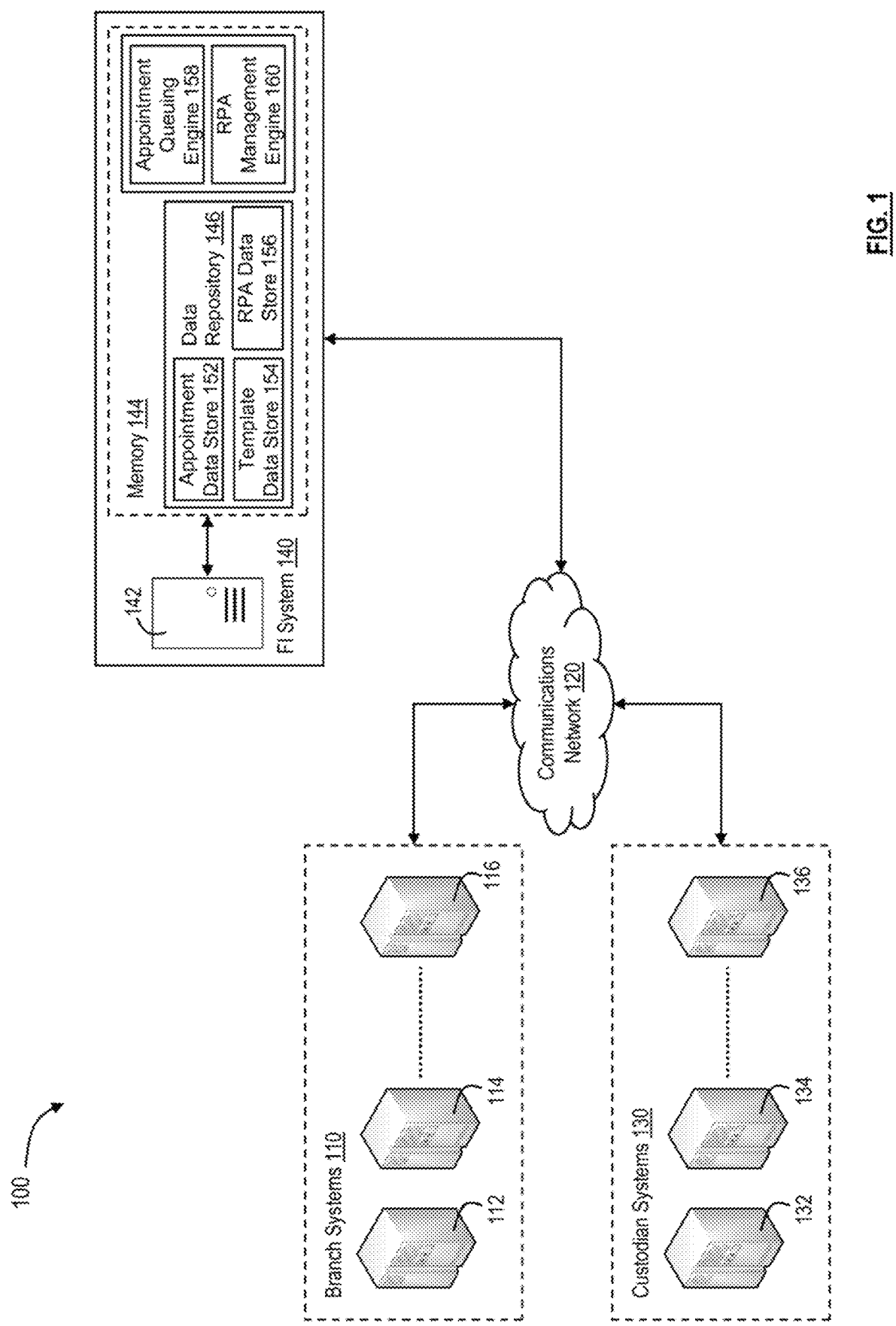
FIGS. 1, 2, 3A, 3B, 4A-4C, and 5A are block diagrams illustrating portions of an exemplary computing environment, in accordance with some exemplary embodiments.

This specification relates to computer-implemented processes that, among other things, manage adaptively queued appointment workflow through a virtualization of robotic process automation (RPA) techniques and an implementation of template-based document generation processes. By way of example, and as described herein, financial institutions often maintain retail branches at locations dispersed not only across multiple geographic regions, but also across multiple time zones. Although the scope of financial products and services delivered to customers through digital channels continues to expand, many financial institutions rely on in-person, branch-based appointments when provisioning certain financial products or services to corresponding customers. For instance, and on a daily basis, the geographically dispersed retail branches of a financial institution may schedule and conduct appointments with thousands of customers regarding financial services and products that include, but are not limited to, lending or mortgage services, investment planning and services, or estate, or tax planning, and the provisioning of financial services and products during each of these appointments may be informed by an accurate and timely understanding of each customer's financial position and goals, and of the interactions between each customer and not only the financial institution, but also with other financial institutions, governmental or judicial entities, and reporting agencies.

In some instances, and in preparation for an appointment to discuss a particular financial product, such as a potential home mortgage, with a customer at a corresponding retail branch, a representative of the financial institution (e.g., a branch manager, loan officer, etc.) obtain information that identifies and characterizes the customer's current assets, liabilities, and obligations, and further, that identifies and characterizes that customer's interactions with not only the financial institution, but also with other financial institutions, governmental entities, or legal entities. For example, the representative may access, via a web browser executed by a computing system at the retail branch (e.g., a "branch" computing system), web pages, graphical user interfaces (GUIs), or other digital portals associated with various data repositories maintained by the financial institution and other external sources of information (e.g., other financial institutions, credit reporting agencies, etc.), and obtain elements of the information from each of the repositories based on a corresponding customer identifier (e.g., a government-issued identifier, such as a social-security number, etc.). Using the corresponding system or device, the representative may incorporate portions of the obtained information into a document, e.g., a PDF document, for review prior to or during the customer meeting.

In other instances, a computing system associated with, operated by the financial institution (e.g., a "FI" computing system) may, upon execution of one or more application programs, perform operations that establish a secure channel of communications with each of the data repositories via a corresponding programmatic interface, such as, but not limited to, an application programming interface (API). Prior to a particular scheduled appointment (e.g., involving a corresponding customer and scheduled a corresponding retail branch), the executed application program may cause the FI computing system to request, and receive, elements of the information characterizing the customer, the customer's interactions with the financial institution, or the customer's interaction with other financial institutions, governmental or judicial entities, or regulatory agencies from the data repositories via corresponding ones of programmatic interfaces. The executed application program may also cause the FI computing system to generate a guidance document for the scheduled appointment that includes all or a selected portion of the obtained information, and may transmit the generated guidance document to the corresponding branch system for review by the representative prior to, or during, the scheduled appointment.

While the operations performed manually by the representatives of the financial institution, and additionally, or alternatively, the operations performed programmatically by the application program executed at the FI computing system, may facilitate access to and provisioning of customer-specific information to a branch manager prior to corresponding ones of the scheduled customer appointments, these manual or programmatic operations may be repeated thousands of times daily in preparation for the geographically and temporally dispersed appointments scheduled at the retail branches of the financial institution. Further, and in addition to consuming significant amounts of the representatives' workdays, these manually implemented operations may also result in wide, but unintended, distribution of confidential customer information throughout the financial institution, which may increase a likelihood of a misuse or an unauthorized distribution of that confidential customer information.

Moreover, and to facilitate the implementation of these programmatic operations by the FI computing systems, each of the data repositories may perform operations that public, or render accessible, data characterizing corresponding ones of the programmatic interfaces, such as, but not limited to, data identifying a composition or format of input to a corresponding API, or data identifying a structure and format of an expected output of that corresponding API. In some instances, the exposure of these programmatic interfaces to one or more of the FI computing systems may establish a direct, and potentially more damaging, level of access to the functionalities of these programmatic interfaces, and may increase a likelihood of attacks by malicious third parties when compared to the operations that access confidential, customer-specific data maintained by the data repositories with corresponding graphical user interfaces (GUIs) or digital portals.

Certain of the exemplary processes described herein may virtualize and automate certain operations performed manually by the representatives of the financial institution through an instantiation of one or more virtual machines at a computing system of the financial institution and through an implementation, by each of the instantiated virtual machines, of robotic process automation (RPA) techniques. By way of example, and as described herein, these RPA techniques, when implemented by each of the instantiated virtual machines, may enable each of these virtual machines to execute one or more software robots (e.g., "bots") that, among other things, access a graphical user interface (GUI) or other digital portal of one or more of the data repositories based on a corresponding application model (e.g., that establishes the structure, layout, or input format associated with interface elements disposed across various display screens of the GUI or digital portal) and corresponding elements of processing logic (e.g., that establishes and specifies points of interaction between the corresponding bots and the interface elements of the GUI or digital portal), and obtain one or more elements of confidential, customer-specific data associated corresponding scheduled appointments within an allocated portion of queued appointment data.

In some instances, the processing logic associated with the GUI or digital portal of each data repository may incorporate a subset of those operations performed manually by representatives of the financial institution when accessing the corresponding GUI or digital portion, such as, but not limited to, a streamlined, optimized, or aggregated subset of the manually performed operations. As such, when the "bot" executed by an instantiated virtual machine accesses programmatically the GUI or digital portal of a data repository based on the corresponding processing logic, the executed bot may obtain the elements of confidential, customer-specific data associated with each allocated appointment using fewer discrete interactions with the interface elements of the GUI or digital portal, and fewer corresponding computational operations, than would be required for a corresponding manual implementation.

Furthermore, as certain of the exemplary processes described herein enable each of the instantiated virtual machines to access programmatically one or more of the data repositories through a corresponding GUI or digital portal in accordance with respective application models and elements of processing logic, these exemplary processes may reduce a likelihood of attacks by malicious third parties, and increase a security and confidentiality of the underlying elements of customer-specific data, when compared to conventional processes that rely on exposed programmatic interfaces. Thus, certain of these exemplary processes may be implemented in addition to, or as an alternate to, conventional automated processes that access elements of customer-specific data programmatically through corresponding APIs.

In addition, and as described herein, the computing system of the financial institution may aggregate the elements of confidential, customer-specific data obtained from each of the instantiated virtual machines (e.g., that execute corresponding software bots implemented RPA techniques), and may associate each elements of the confidential, customer-specific data within a corresponding element of appointment data maintained within a corresponding appointment queue. Through a selective application of an appointment-specific document template to the linked elements appointment and customer-specific data, certain of the exemplary processes described herein may generate an appointment-specific guidance document for each of appointment within the appointment queue, and further, may transmit, to a computing system associated with each retail branch, a single data file that includes the encrypted guidance documents associated appointments scheduled at the retail branch during the corresponding temporal interval.

Through the transmission of a single data file of encrypted guidance documents to the computing system of each retail branch of the financial institution, certain of the exemplary processes described herein may reduce an exposure of raw elements of confidential customer data during transmission to the computing systems of the retail branches, and such, may reduce, or eliminate, opportunities for breach or attack by malicious third parties during provisioning of the encrypted guidance documents to the retail-branch computing systems. In some instances, certain of these exemplary processes may be implemented in addition to, or as an alternate to, conventional processes that generate guidance documents at the retail branch, or that provision guidance documents to the computing system of the retail branch, on an appointment-by-appointment basis.

A. Exemplary Computing Environments

FIG. 1 is a diagram of an exemplary computing environment 100, consistent with certain disclosed embodiments. For example, as illustrated in FIG. 1, environment 100 may include one or more computing systems associated with or operated by a financial institution, such as financial institution (FI) system 140. Environment 100 may also include one or more additional computing systems, such as branch systems 110, that are disposed at corresponding retail branches of that financial institution. For example, branch systems 110 may include, but are not limited to, discrete branch systems 112, 114, and 116, and in some instances, one or more of branch systems 112, 114, and 116 may be disposed at a corresponding retail branch of the financial institution (e.g., at a corresponding geographic location) and may be operated by a corresponding representative of the financial institution, such as a branch manager or a loan officer.

Additionally, and as illustrated in FIG. 1, environment 100 may also include one or more custodian systems 130, such as, but not limited to, custodian systems 132, 134, and 136. In some instances, one or more of custodian systems 130, including custodian systems 132, 134, and 136, may be operated by or associated with the financial institution, corresponding ones of the additional financial instances, or corresponding ones of the governmental, regulatory, or judicial entities. Further, each of custodian systems 130, including systems 132, 134, and 136, may maintain elements of confidential, customer-specific data identifying and characterizing customers of the financial institution and additionally, or alternatively, interactions between these customers and not only the financial institution, but also with additional financial institutions and various governmental, judicial or regulatory entities.

Although not illustrated in FIG. 1, each of custodian systems 130 (including custodian systems 132, 134, and 136) may execute an application program having an application front end exposed to one or more computing devices or systems across network 120 via a corresponding graphical user interface (GUI) or digital portal, and an application back end. As described herein, the application back end may access the elements of confidential, customer-specific data maintained within corresponding data repositories (e.g., based on commands generated by the application front end in response to interaction with the corresponding GUI or digital portal), and may route accessed elements of the confidential, customer-specific data back to the application front end (e.g., for presentation within the corresponding GUI or digital portal or for provisioning to the requesting computing system or device).

In some instances, FI computing system 140, each of branch systems 110 (including discrete branch systems 112, 114, and 116), and each of custodian systems 130 (including discrete custodian systems 132, 134, and 136) may be interconnected through one or more communications networks, such as communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some instances, the devices and systems operating within environment 100 may perform operations that establish and maintain one or more secure channels of communication across network 120, such as, but not limited to, a transport layer security (TSL) channel, a secure socket layer (SSL) channel, or any other suitable secure communication channel.

Referring back to FIG. 1, each of FI computing system 140, branch systems 110 (including branch systems 112, 114, and 116), and custodian systems 130 (including custodian systems 132, 134, and 136) may represent a computing system that includes one or more servers and tangible, non-transitory memory devices storing executable code and application modules. The one or more servers may each include one or more processors or processor-based computing devices, which may be configured to execute portions of the stored code or application modules to perform operations consistent with the disclosed embodiments. For example, FI computing system 140 may include one or more servers 142 configured to execute portions of the stored code or application modules (e.g., as maintained within one or more tangible, non-transitory memories 144) and perform any of the exemplary processes described herein to manage queued appointment workflow using robotic process automation. Further, although not illustrated in FIG. 1, each of FI computing system 140, branch systems 110 (including branch systems 112, 114, and 116), custodian systems 130 (including custodian systems 132, 134, and 136) may include a communications unit or interface coupled to corresponding one of the one or more processors for accommodating wired or wireless communication across network 120 with any of the additional network-connected systems or devices described herein, e.g., a transceiver device.

For instance, one or more of FI computing system 140, branch systems 110 (including branch systems 112, 114, and 116), and custodian systems 130 (including custodian systems 132, 134, and 136) may correspond to a single, discrete computing system operating within environment 100. In other instances, the functionalities of FI computing system 140, branch systems 110 (including branch systems 112, 114, and 116), or custodian systems 130 (including custodian systems 132, 134, and 136) may be performed by a combination of discrete computing systems operating within environment 100. Further, in some instances, one or more of FI computing system 140, branch systems 110 (including branch systems 112, 114, and 116), and custodian systems 130 (including custodian systems 132, 134, and 136) may correspond to a distributed system that includes computing components distributed across one or more networks, such as network 120, or other networks, such as those provided or maintained by cloud-service providers (e.g., Google Cloud™, Microsoft Azure™, etc.).

To perform any of the exemplary processes described herein, FI computing system 140 may maintain, within one or more of tangible, non-transitory memories 144, a data repository 146 that includes an appointment data store 152, a template data store 154, and a robotic process automation (RPA) data store 156. In some instances, appointment data store 152 may maintain an appointment queue of prioritized and ordered elements of appointment data identifying and characterizing one or more appointments scheduled at each of the retail branches of the financial institution during a corresponding temporal interval, such as, but not limited to, a business day at the retail branches. As described herein, each of the scheduled appointments may involve a corresponding customer of the financial institution and may be characterized by a corresponding appointment type (e.g., a mortgage application, investment planning, tax planning, etc.). Further, the elements of structured or unstructured appointment data may include, for each of the scheduled appointments, branch information that identifies the corresponding retail branch (e.g., an alphanumeric branch identifier, etc.), customer information that identifies and characterizes the customer (e.g., a customer name, an alphanumeric identifier assigned to the customer by the financial institution, etc.), scheduling data that identifies that a scheduled appointment time, date, or location, and appointment type data that identifies the corresponding appointment type.

Template data store 154 may include template data identifying and characterizing document templates that, when processed by FI computing system 140, facilitate a generation of guidance documents associated with each of the elements of appointment data maintained within the appointment queue, e.g., within appointment data store 152. In some instances, each of the document templates may be associated with a corresponding one of the appointments types available for scheduling by the financial institution at the retail branches (e.g., mortgage lending, investment planning, tax planning, retirement planning, etc.), and the template data associated with each of the document templates may include the corresponding appointment type. Further, the template data may specify, for each of the document templates, one or more elements of digital content (e.g., textual content, etc.) for inclusion within the generated guidance documents, along with discrete elements of placeholder data that identify or reference corresponding elements of confidential customer data (e.g., the elements of customer profile, account, and/or reporting data described herein) and formatting data that establishes visual characteristics of the one or more elements of digital content when displayed within the generated guidance documents.

RPA data store 156 may include elements of data that facilitate an execution of one or more software robots (e.g., "bots") by one or more virtual machines instantiated at FI computing system 140, e.g., by executed RPA management engine 160 using any of the exemplary processes described herein. Each of the executed bots may, for example, include one or more objects and elements of processing logic that encode sequential operations performed by corresponding ones of the objects. In some instances, one or more of the objects may be configured by the elements of the processing logic to interact with a corresponding one of the application programs executed by custodian systems 130 (e.g., custodian system 132, 134, and 136), and to perform actions or operations specified by the elements of processing logic, such as, but not limited to, logging into the corresponding GUI or digital portal, requesting and retrieving elements of the confidential, customer-specific data, and logging out of the corresponding GUI or digital portal. Further, the objects may include, and may be defined by, corresponding application models and corresponding elements of action data. By way of example, and for a particular one of the objects, the application model may expose that object the application program executed by one of custodian systems 130, and may identify and characterize interface elements displayed within one or more display screens of the corresponding GUI or digital portal (e.g., a type of interface element, an appropriate format or structure of input data, etc.). Further, and for the particular data object, the elements of action data may identify those discrete or sequential actions that the object can perform during interaction with the application program and in accordance with the application model.

Referring back to FIG. 1, and to facilitate the performance of the exemplary RPA techniques described herein, RPA data store 156 may maintain, within structured or unstructured data records, one or more elements of the processing logic, one or more of the application models, and corresponding elements of action data that, when provisioned or rendered accessible to the instantiated virtual machines, facilitates the execution of corresponding ones of the bots and the specified interaction between these bots and the application programs executed at each of custodian systems 130, including custodian systems 132, 134, and 136, e.g., in accordance with the elements of processing logic. Further, RPA data store 156 may also maintain, within the structured or unstructured data records, information associated with one or more tools (e.g., bot development tools, bot management tools, etc.), libraries, and runtime environments for programmatic bots executed by the instantiated virtual machines.

In some instances, the elements of processing logic may encode programmatically generated sets of sequential operations that, when implemented by the executed programmatic bots, enable the executed programmatic bots to access corresponding ones of the application programs executed at custodian systems 130 and obtain elements of confidential customer-specific data associated with each of the allocated subsets of the queued and prioritized appointment data, e.g., as allocated to each of the instantiated virtual machines. As described herein, the executed programmatic bots (e.g., as configured by the elements of processing logic may obtain the elements of confidential, customer-specific data from custodian systems 130 more efficiently and using fewer discrete operations when compared to manual interactions between representatives of the financial institution and graphical interfaces of the executed application programs.

Further, the elements of confidential customer data obtained through the exemplary, programmatic, RPA-based processes described herein may exhibit fewer errors and inconsistencies than comparable elements of confidential customer data obtained through these manual operations (e.g., due to a reduction in keystroke errors, transposition errors, etc., by the representatives of the financial institution during interaction with the graphical interfaces of the executed application programs). Additionally, in some instances, certain of these exemplary processes, when implemented through the executed programmatic bots, may reduce instances of unauthorized access, misuse, or distribution of the confidential customer data (e.g., as these exemplary processes limit a number of the representatives of the financial institution capable of accessing the confidential customer data), and may increase a security of the confidential customer data maintained at custodian systems 130 (e.g., as these exemplary processes provision access to the confidential customer data through graphical interfaces without exposing corresponding programmatic interfaces to computing systems or devices within environment 100).

RPA data store 156 may also maintain, within the structured or unstructured data records, elements of session data that characterize a performance of each of the virtual machines instantiated by FI computing system 140 and additionally, or alternatively, the sequential operations performed by each of the programmatic bots executed by the instantiated virtual machines, e.g., through the performance of the exemplary RPA-based processed described herein. In some instances, the elements of session data maintained within RPA data store 156 may enable one or more applications executed by FI computing system 140 to monitor, and adaptively adjust, the subset of the queued and prioritized elements of appointment data allocated to each of the instantiated virtual machines.

Referring back to FIG. 1, FI computing system 140 may also maintain, within one or more of tangible, non-transitory memories 144, one or more executable application programs 148, such as, but not limited to, an appointment queuing engine 158 and a robotic process automation (RPA) management engine 160. When executed by FI computing system 140 (e.g., by the one or more processors of FI computing system 140), appointment queuing engine 158 can perform operations that access elements of appointment data received by FI computing system 140 from computing systems associated with or operated by one or more of the retail branches of the financial institution, such as branch systems 110, and perform operations and prioritize and queue each of the elements of appointment data in accordance with prioritization factors that include, but are not limited to, a corresponding appointment time, a corresponding geographic region or location (e.g., a postal code, a time zone, etc.), a corresponding customer, or a corresponding appointment type. As described herein, executed appointment queuing engine 158 may perform operations that store the prioritized elements of appointment data within a portion of memory 144, e.g., within the appointment queue of appointment data store 152.

When executed by the one or more processors of FI computing system 140, RPA management engine 160 may perform operations that instantiate and/or clone one or more virtual machine executable by FI computing system 140 and provision, to the instantiated or cloned virtual machines, corresponding application models and elements of action data (e.g., as object information), which establish respective ones of the programmatic bots executable by the virtual machines, and corresponding elements of processing logic, which establish the sequential operations performed by each of the executed programmatic bots. For example, and upon execution by the one or more processors of FI computing system 140, RPA management engine 160 may perform operations consistent with a virtual machine manager (VMM) or hypervisor that, among other things, provides each of the instantiated virtual machines with a virtual operating platform and manages the execution of the programmatic bots by these virtual machines using the virtual operating platform and in accordance with the corresponding elements of the processing logic. Further, executed RPA management engine 160 may also perform operations that monitor a performance and operation of each of the instantiated virtual machines and additionally, or alternatively, each of the execution of programmatic bots, and that store corresponding elements of session data indicative of the monitored performance and operation within memory 144, within RPA data store 156.

B. Exemplary Processes for Managing Queued Appointment Data using Robotic Process Automation and Template-Based Guidance Documents In some instances, the financial institution associated with FI computing system 140 may maintain retail branches disposed across multiple geographic regions and across multiple time zones, and each of these geographically dispersed retail branches may, during a corresponding temporal interval (e.g., a business day), schedule customer appointments that facilitate a provisioning of financial services to these customers. The scheduled customer appointments may, for example, include in-person, branch-based appointments, telephone-based appointments, or interactive digital sessions (e.g., chat- or message-based sessions) between one or more representatives of a financial institution (e.g., a branch manager, a loan officer, an investment advisor, etc.) and a corresponding customer. Further, and as described herein, examples of these financial services include, but are not limited to, lending or mortgage services, investment planning or services, retirement planning services, or tax planning services, and the provisioning of financial services and products during each of these appointments may be informed by an accurate and timely understanding of each customer's financial position and goals, and of the interactions between each customer and not only the financial institution, but also with other financial institutions, governmental or judicial entities, and reporting agencies.

For example, and to schedule an appointment with a corresponding one of the retail branches of the financial institution, a customer may access a digital portal of the financial institution (e.g., via a computing device or system of a customer, such as a smart phone or tablet computer), and may provide input to the computing device or system that requests the appointment to discuss one or more financial services available to that customer through the financial institution. In some instances, and based on the provisioned input, one or more application programs executed at the computing device (e.g., a mobile application of the financial institution) may generate and transmit an appointment request across a communication network, such as network 120 of FIG. 1, to a computing system associated with the corresponding retail branch, such as a corresponding one of branch systems 110 of FIG. 1. In other instances, the appointment request may be generated by the computing system associated with the retail branch based on input provided by an employee of the financial institution (e.g., based on a telephone-based inquiry received from the customer), or based on information obtained from an ongoing messaging session with the customer (e.g., a session involving a programmatic chatbot or an employee of the financial institution).

The appointment request may, for example, include one or more identifiers of the customer (e.g., a customer name or a unique alphanumeric identifier assigned to the customer by the financial institution, such as an alphanumeric access or login credential assigned to the customer) and data that identifies and characterizes the requested appointment, such as, but not limited to, a requested appointment date, a requested appointment time, a requested appointment location (e.g., an alphanumeric identifier, a postal code, or a city, province, or state of the corresponding retail location), and a requested appointment type (e.g., mortgage and lending services, investment planning or services, etc.). The appointment request may also include data that indicates or confirms the customer granted the financial institution permission to access, aggregate, and process, e.g., using branch systems 110 and/or FI computing system 140, elements of confidential data identifying or characterizing the customer, e.g., as maintained within corresponding ones of the custodian systems 130. The data may, for example, include a digital token, cryptogram, hash value, or other element of generated by the mobile application and having a structure or format recognizable by the branch system 110 and/or FI computing system 140.

Upon receipt of the appointment request, the computing system associated with the retail branch, e.g., the corresponding one of branch systems 110, may perform operations that validate the received appointment request and confirm an availability of the requested appointment type at the requested appointment time. Based on the confirmed availability of the requested appointment type at the requested appointment time, the computing system of the retail branch may generate an element of appointment data associated with the now-confirmed appointment, and perform operations that store the generated element of appointment data within a portion of a tangible, non-transitory memory.

The computing systems of the corresponding retail branches and of one or more one or more additional retail branches maintained by the financial institution (e.g., one or more of branch systems 110 of FIG. 1) may also receive further appointment requests from the customer devices or systems, or generate further appointment requests programmatically in response to telephone- or messaging-session-based inquiries. These computing systems may also perform any of the exemplary scheduling processes described herein to validate, confirm, and schedule customer appointments during various future temporal intervals based on corresponding ones of the received or generated appointments requests, and to generate elements of appointment data associated with each of the scheduled customer appointments. In some instances, and at a predetermined time prior to each of the future temporal intervals, one or more of the computing systems of the retail branches (e.g., the one or more of branch systems 110) may extract, from the corresponding tangible, non-transitory memories, the elements of appointment data associated with customer appointments scheduled during the future temporal interval, and may transmit the extracted elements of appointment data across network 120 to one or more computing systems of the financial institution, such as FI computing system 140.

For example, one or more of the future temporal intervals may correspond to a business day of the financial institution (e.g., Apr. 30, 2020), and the computing systems of the retail branches may perform any of the exemplary processes described herein to schedule corresponding ones of the customer appointments at various available times throughout that business day. Further, and by way of example, the predetermined time prior to the business day may include, but is not limited to, a predetermined time on the business day (e.g., 12:01 a.m. EDT on Apr. 30, 2020), a predetermined time prior to that business day (e.g., 12:01 a.m. EDT on Apr. 29, 2020, or on Apr. 28, 2020). As described herein, each of the computing systems of the retail branches, e.g., branch systems 110, may perform operations that extract, and transmit to FI computing system 140, the elements of appointment data characterizing customer appointments scheduled on Apr. 30, 2020, and as described below in reference to FIG. 2, FI computing system 140 may perform any of the exemplary process described herein to prioritize each of the scheduled customer appointments based on the corresponding elements of appointment data, and establish and maintain an appointment queue, e.g., within appointment data store 152 of data repository 146 of FIG. 1, that includes the elements of appointment data ordered in accordance with the established priority of the corresponding appointments.

Figure 2:
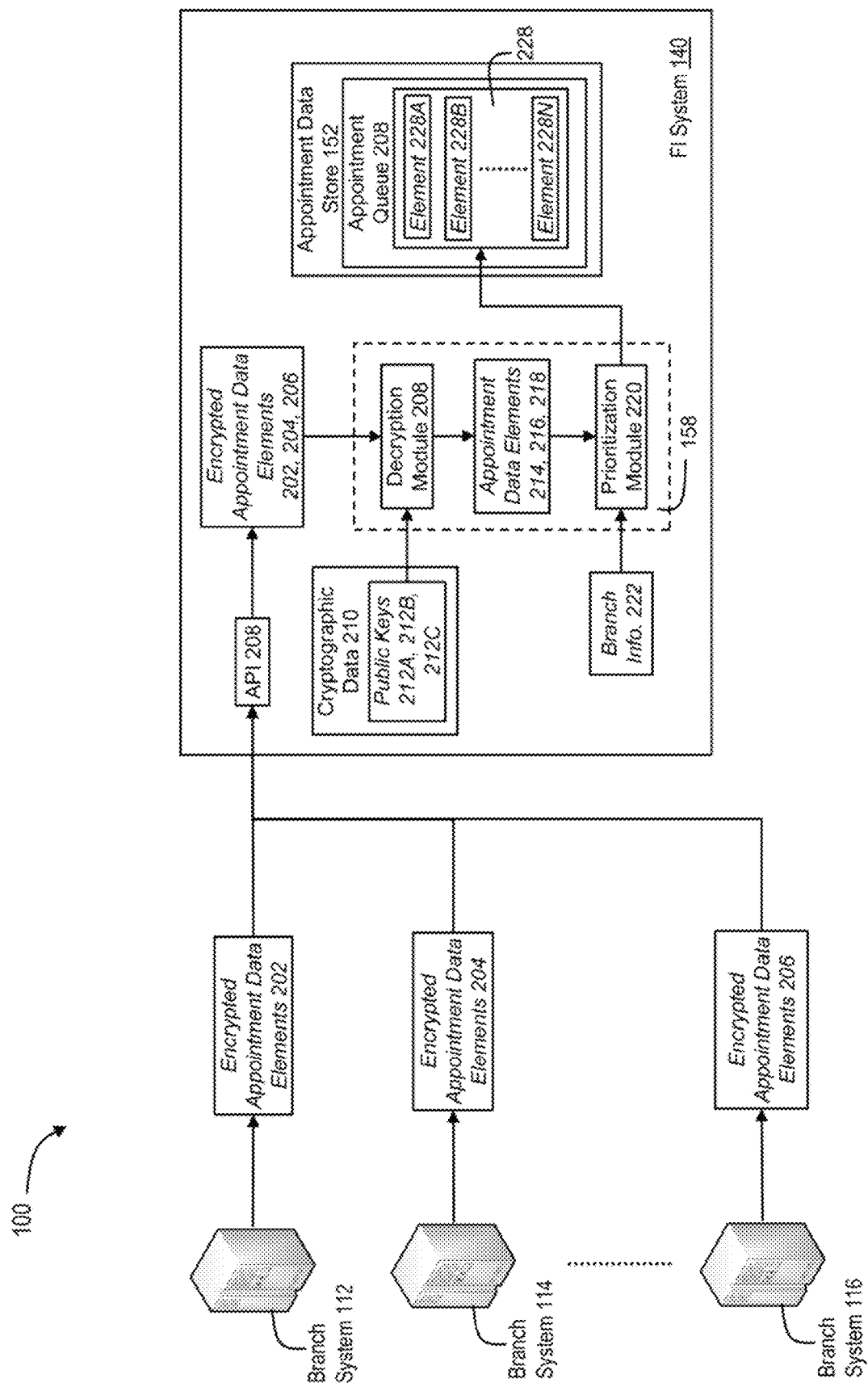

Referring to FIG. 2, and at the predetermined time prior to the future temporal interval (e.g., at the predetermined time on, or prior to, the Apr. 30, 2020, business day of the financial institution), each of branch systems 110 may perform operations that extract elements of appointment data associated with customer appointments scheduled during the business day of Apr. 30, 2020, and that encrypt the extracted elements of appointment data prior to transmission across network 120 to FI computing system 140. For example, branch system 112 may extract, from a corresponding tangible, non-transitory memory, appointment data elements that identify and characterize corresponding customer appointments scheduled at the retail branch associated with branch system 112 during the business day of Apr. 30, 2020. In some instances, branch system 112 may perform operations that encrypt the appointment data elements, e.g., using a private cryptographic key generated by or provisioned to branch system 112, and may transmit encrypted appointment data elements 201 across network 120 to FI computing system 140.

Further, and by way of example, branch system 114 may extract, from a corresponding tangible, non-transitory memory, additional appointment data elements that identify and characterize corresponding customer appointments scheduled at the retail branch associated with branch system 114 during the business day of Apr. 30, 2020, and branch system 116 may extract, from a corresponding tangible, non-transitory memory, additional appointment data elements that identify and characterize corresponding customer appointments scheduled at the retail branch associated with branch system 116 during the business day of Apr. 30, 2020. In some instances, branch systems 114 and 116 may also perform operations that encrypt respective ones of the additional appointment data elements, e.g., using a corresponding private cryptographic key, and may transmit respective ones of encrypted appointment data elements 203 and 205 across network 120 to FI computing system 140.

A programmatic interface associated with one or more application programs executed at FI computing system 140, such as an application programming interface (API) 208, may receive encrypted appointment data elements 202, 204, and 206 from respective ones of branch systems 112, 114, and 116, and may route each of encrypted appointment data elements 202, 204, and 206 to one or more application programs executed by the one or more processors of FI computing system 140, such as appointment queuing engine 158, which may be executed by the one or more processors of FI computing system 140. In some instances, a decryption module 208 of executed appointment queuing engine 158 may access cryptographic data 210 (e.g., as maintained within tangible, non-transitory memory 144) and may obtain public cryptographic keys 212A, 212B, and 212C associated with respective ones of branch systems 112, 114, and 116. Decryption module 208 may perform operations that decrypt each of encrypted appointment data elements 202, which characterize customer appointments scheduled at the retail branch associated with branch system 112 on the April 30$^{th}$ business day, using public cryptographic key 212A, and provide decrypted appointment data elements 214 as an input to a prioritization module 220 of executed appointment queuing engine 158. Decryption module 208 may perform further operations that decrypt each of encrypted appointment data elements 204 (e.g., that characterize customer appointments scheduled at the retail branch associated with branch system 114 on the April 30$^{th}$ business day) using public cryptographic key 212B, and provide decrypted appointment data elements 216 as an additional input to prioritization module 220. Additionally, decryption module 208 may perform operations that decrypt each of encrypted appointment data elements 206 (e.g., that characterize customer appointments scheduled at the retail branch associated with branch system 116 on the April 30$^{th}$ business day) using public cryptographic key 212C, and provide decrypted appointment data elements 218 as inputs to prioritization module 220.

In some instances, prioritization module 220 may receive decrypted appointment data elements 214, 216, and 218, and may perform operations that prioritize each of the customer appointments scheduled for the April 30$^{th}$ business day based on corresponding ones of decrypted appointment data elements 214, 216, and 218. Further, and as described herein, prioritization module 220 may perform further operations that establish and maintain an appointment queue 226, e.g., within appointment data store 152 of data repository 146, that includes prioritized elements 228 of appointment data ordered in accordance with the established priority of the corresponding customer appointments within the April 30$^{th}$ business day.

By way of example, and as described herein, the retail branches of the financial institution (and corresponding ones or branch systems 110) may be disposed within multiple geographic regions and further, may operate within multiple local time zones having corresponding offsets from a temporal reference, such as Coordinated Universal Time (UCT). Thus, in preparation for a customer appointment scheduled for 9:00 a.m. EDT (e.g., UTC-04:00) at a retail branch in Toronto, Canada, a representative of the financial institution may require information characterizing the customer and the customer's interaction with various financial institutions and governmental, judicial, or regulatory entities earlier in the financial institution's business day than would be required for a comparable appointment scheduled for 9:00 a.m. PST (e.g., UTC-07:00) in Vancouver, Canada. To account for these temporal variations in the requirements for customer-specific information across the geographically dispersed retail locations of the financial institution, prioritization module 220 may perform operations that establish the temporal reference for the April 30$^{th}$ business day of the financial institution (e.g., based on Coordinated Universal Time (UCT), as described herein), that compute a reference appointment time for each of the customer appointments scheduled during the April 30$^{th}$ business day, and that prioritize the decrypted appointment data elements 214, 216, and 218 based on a disposition of the corresponding reference appointment time with the April 30$^{th}$ business day of the financial institution.

By way of example, prioritization module 220 may access, within memory 144, one or more elements of branch information 222, which identifies each of the retail branches of the financial institution and includes, among other things, the alphanumeric branch identifier, geographic information associated with each retail branch (e.g., a postal code, a province or state, etc.) and a local time zone and corresponding offset associated with each retail branch. For each discrete element of decrypted appointment data elements 214, 216, and 218, prioritization module 220 may perform operations that extract information identifying the corresponding retail branch and corresponding local appointment time, and may reference the extracted information identifying the corresponding retail branch to identify the local time zone, and offset from the temporal reference, associated with the corresponding retail branch. Prioritization module 220 may compute, for each discrete element of decrypted appointment data elements 214, 216, and 218, a reference appointment time consistent with the temporal reference of the financial institution (e.g., by converting the appointment time in the local time zone into the temporal reference), and may perform further operations that package, for each of the scheduled customer appointments, the computed reference appointment time and data maintained within a respective element of decrypted appointment data elements 214, 216, and 218 into a corresponding element of prioritized appointment data, e.g., a corresponding one of appointment data elements 228.

In some instances, prioritization module 220 may also perform operations that parse appointment data elements 228 and order appointment data elements 228 in accordance with the computed reference appointment time, e.g., from earliest to latest. As illustrated in FIG. 2, prioritization module 220 may store each of newly ordered appointment data elements 228 within appointment queue 226 of appointment data store 152, which establishes a temporal prioritized set of appointment data elements associated with customer appointments scheduled within the April 30$^{th}$ business day of the financial institution, e.g., appointment data elements 228A, 228B, . . . 228N. Further, in some examples, the temporal prioritization of the scheduled customer appointments, e.g., based on the reference appointment times, may also facilitate a geographic prioritization of these scheduled customer appointments on the basis of local time zone from east (e.g., Atlantic Standard Time (UTC-04:00)) to west (e.g., Pacific Standard Time (UTC-08:00). The disclosed exemplary embodiments are, however, not limited to processes that prioritize scheduled customer appointments based on temporal or geographic factors, and in other instances, prioritization module 220 may perform operations that further prioritize certain of the scheduled customer appointments based on prioritization factors that include, but are not limited to, a corresponding appointment type of, or a corresponding customer associated with, the scheduled customer appointments.

Through certain of the exemplary processes described herein, FI computing system 140 may establish and maintain, within appointment queue 226 of FIG. 2, prioritized elements of appointment data identifying and characterizing customer appointments scheduled at the retail branches of the financial institution during a corresponding business day, such as Apr. 30, 2020. In some instances, each of the scheduled customer appointments, and the corresponding elements of queued appointment data, may be prioritized in accordance with a reference appointment time within the business day of the financial institution and additionally, or alternatively, in accordance with prioritization factors that include, but are not limited to, an appointment location, an appointment type, or a corresponding customer. Further, and as described herein, the provisioning of financial services during each of the scheduled, and now-prioritized, customer appointments may be information by information that characterizes each customer's interaction within the financial institution, and with other financial institutions, governmental entities, regulatory entities, or judicial entities, which may be maintained by various computing systems within environment 100, such as one or more of custodian systems 130.

As described below in reference to FIGS. 3A, 3B, and 4A-4C, FI computing system 140 may perform operations that instantiate or clone one or more virtual machines, which may be provisioned with corresponding elements of object and action data and elements of processing logic that, collectively, enable these instantiated virtual machines to execute corresponding programmatic software robots (e.g., "bots). These executed programmatic "bots" may, for example, implement one or more exemplary robotic process automation (RPA) techniques that, as described herein, access graphical user interfaces (GUIs) or digital portals maintained by corresponding ones of custodian systems 130 (e.g., custodian systems 132, 134, and 136), and request and receive confidential customer information associated with each appointment within a selectively allocated subset of the queued appointment data elements.

In some instances, the virtualized implementation of these exemplary RPA techniques by FI computing system 140 may reduce the number of discrete interactions between computing systems of the financial institution and the GUIs or digital portals of custodian systems 130, and as such, the number of discrete computational operations by these computing systems, required to access and obtain the confidential customer data associated with the queued appointment data elements. Additionally, and as described herein, the virtualized implementation of these exemplary RPA techniques by FI computing system 140 may also reduce unauthorized access to, and distribution of, confidential customer information within the financial institution (e.g., due to a reduction in an exposure of this information among representatives of the financial institution), and further, may reduce a likelihood of attacks by malicious third parties on custodian systems 130, and increase a security and confidentiality of the underlying elements of customer information at custodian systems 130 (e.g., due to a reduction in an exposure of corresponding application programming interfaces across network 120).

Figure 3A:
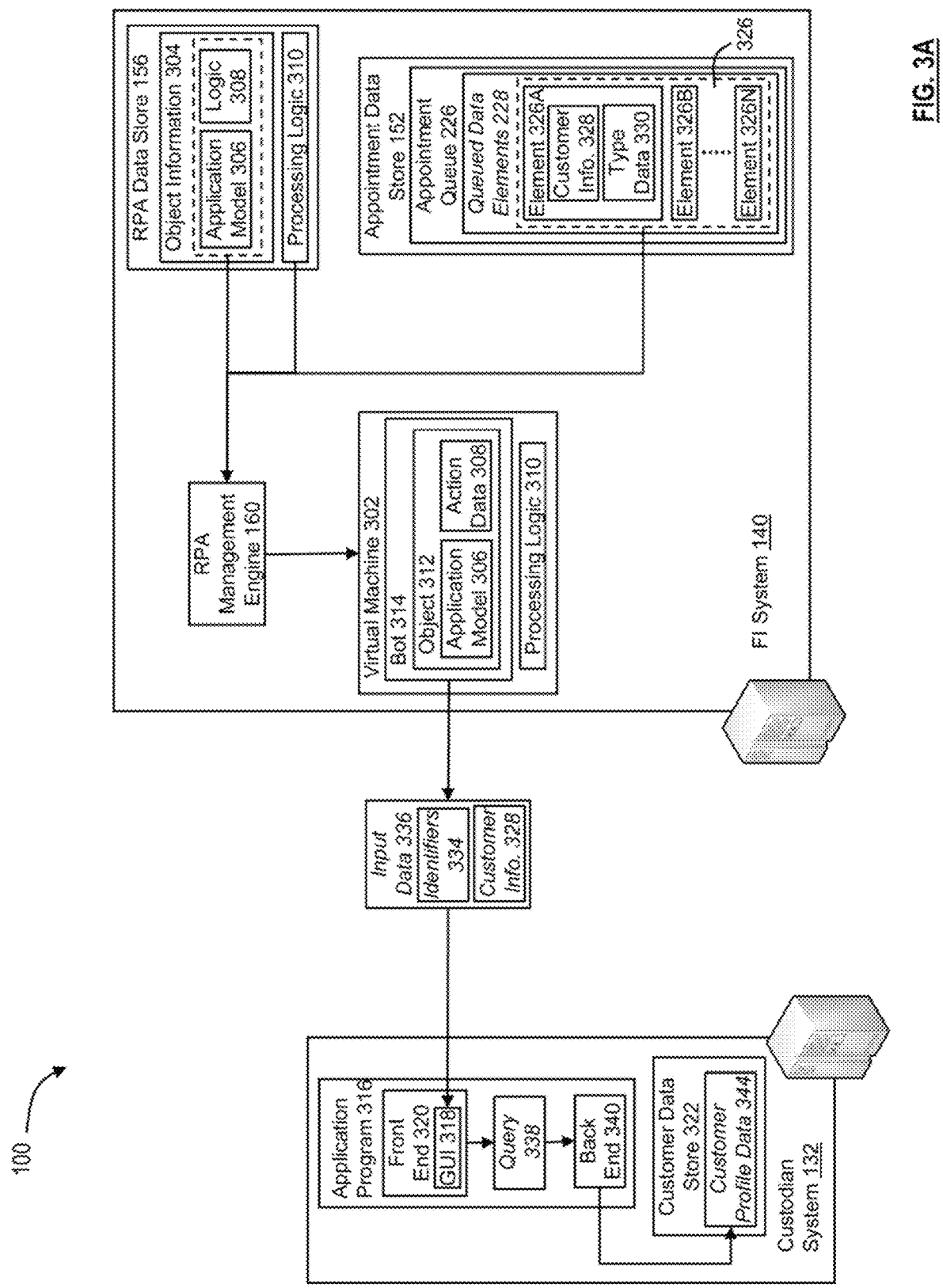

Referring to FIG. 3A, the one or more processors of FI computing system 140 may execute RPA management engine 160, which may perform operations that instantiate (or clone) one or more virtual machines at FI computing system 140, and that manage an execution of, and a selective allocation of subsets of the queued appointment data elements to, each of the instantiated virtual machines. In some instances, each of the instantiated virtual machines may execute one or more programmatic software robots (e.g., programmatic "bots"), and the executed programmatic bots may be configured by the elements of processing logic to perform operations that obtain, from corresponding ones of custodian systems 130, elements of confidential customer information associated with each of the allocated appointment data elements, e.g., using any of the exemplary RPA techniques described herein. As described herein, each of the executed programmatic bots may include, and may be established by, one or more corresponding executable objects, and the elements of processing logic may encode sequential operations performed by corresponding ones of the objects.

Further, the executable objects may be configured by the elements of the processing logic to interact with one or more application programs executed by corresponding ones of custodian systems 130 (e.g., custodian system 132, 134, and/or 136), and to perform actions or operations specified by the elements of processing logic, such as, but not limited to, logging into a GUI or digital portal, requesting and retrieving elements of the confidential customer data, and logging out of the corresponding GUI or digital portal. To facilitate such interaction, the executable objects may include, and may be defined by, corresponding application models and corresponding elements of action data. By way of example, and for a particular one of the executable objects, the application model may expose that object the application program executed by one of custodian systems 130, and may identify and characterize interface elements displayed within one or more display screens of the corresponding GUI or digital portal (e.g., a type of interface element, an appropriate format or structure of input data, etc.). Further, and for the particular executable object, the elements of action data may identify those discrete or sequential actions that the object can perform during interaction with the application program and in accordance with the application model.

For example, and as illustrated in FIG. 3A, executed RPA management engine 160 may provision, to instantiated virtual machine 302, object information 304, which include includes a corresponding application model 306 and action data 308, and one or more elements of processing logic 310. Virtual machine 302 may process object information 304 and perform operations that generate an executable object 312 based on application model 306 and action data 308, and that establish a programmatic software robot, e.g., bot 314, that includes executable object 312. In some instances, application model 306 may expose executable object 312 to an application program executed by one of custodian systems 130, such as application program 316 executed by custodian system 132 of FIG. 3A, and may identify and characterize interface elements displayed within one or more display screens of a GUI or digital portal generated by application program 316, such GUI 318 generated and presented by front-end 320 of executed application program 316. Further, and by way of example, custodian system 132 may maintain, within one or more tangible, non-transitory memories, a customer data store 322 that includes elements of confidential customer profile data that identify and characterize one or more customers of the financial institution, and executed application program 316 may include an application back-end 340 that selectively provisions, or denies, requests to access to the elements of confidential customer profile data received by application front-end 320, e.g., based on input to the interface elements of GUI 318.

Additionally, executed RPA management engine 160 may also perform operations that allocate selectively, to each of the instantiated and executed virtual machines, a subset of those prioritized and queued elements of appointment data maintained within appointment queue 226, e.g., subsets of prioritized and queued appointment data elements 228 described herein. For example, and as illustrated in FIG. 3A, executed RPA management engine 160 may allocate, to virtual machine 302, a subset 326 of prioritized and queued appointment data elements 228 that includes, but is not limited to, discrete, prioritized appointment data elements 326A, 326B, . . . , 326N. In some instances, executed RPA management engine 160 may allocate, to each of the virtual machines, including virtual machine 302, a predetermined and static number of the discrete, prioritized appointment data elements. In other instances, consistent with the disclosed exemplary embodiments, executed RPA management engine 160 may adaptively allocate numbers of the discrete, prioritized appointment data elements to an instantiated virtual machines, such as virtual machine 302, based on, among other things, a prior performance of that virtual machine (e.g., as specified by locally maintained elements of session data), based on computational resources assigned to that virtual machine (e.g., an amount of available memory, etc.), or based on appointment-specific criteria (e.g., an appointment type, a customer, etc.).

In some instances, the one or more elements of processing logic 310 may encode sequential operations that, when performed by executed programmatic bot 314, cause executable object 312 to access GUI 318 of executed application program 316, and to request and receive, via accessed GUI 318, one or more elements of customer profile data associated with each of the appointment data elements within allocated subset 326, e.g., prioritized appointment data elements 326A, 326B, . . . , 326N. For example, and consistent with the elements of processing logic 310, executed programmatic bot 314 may select, from allocated subset 326, appointment data element 326A, which corresponds to a customer appointment involving mortgage lending services and scheduled at a retail branch in Toronto, Canada, for 9:00 a.m. EDT (1:00 p.m. UTC) on Apr. 30, 2020. Executed programmatic bot 314 may parse prioritized appointment data element 326A to obtain customer information 328, which uniquely identifies the customer involved in the scheduled customer appointment, and appointment type data 330, which identifies the appointment type associated with the customer appointment. As described herein, customer information 328 may include, but is not limited to, a full name of the customer, a governmental identifier assigned to the customer (e.g., a driver's license number, a social security number, etc.), or on or more authentication credentials of the customer at the financial institution (e.g., an alphanumeric login credential, an alphanumeric password, biometric data, etc.), and appointment type data 330 may include one or more unique identifiers of the appointment type of the scheduled appointment (e.g., mortgage services, etc.).

In some instances, executed programmatic bot 314 may establish communications within custodian system 132, and may perform operations that cause executable object 312 to access GUI 318 associated with executed application program 316. Executed programmatic bot 314 may perform also operations (not illustrated in FIG. 3) that cause executable object 312 to provide, as an input to accessed GUI 318, one or more elements of credential data associated with FI computing system 140 and additionally, or alternatively, with the customer involved in the scheduled appointment. By way of example, the elements of credential data may include a login credential and an alphanumeric password assigned to FI computing system 140 by executed application program 316 at custodian system 132, although in other examples, the elements of credential data may include one or more of the alphanumeric password, and/or the biometric data associated with the customer, e.g., as maintained within customer information 328.

Based upon a successful authentication of the elements of credential data by application program 316, executed programmatic bot 314 may perform additional operations that cause executable object 312 to provide, as input to GUI 318, information that identifies and requests one or more elements of the customer profile data maintained at custodian system 132. In some instances, and as described herein, these requested elements of the customer profile data may inform a performance, by a representative of the financial institution, of the scheduled customer appointment associated with appointment data element 326A (e.g., customer appointment involving mortgage lending services and scheduled at a retail branch in Toronto, Canada, for 9:00 a.m. EDT on Apr. 30, 2020). Further, and as described herein, the requested elements of the confidential data may be specific to the particular type of appointment identified by appointment data element 326A (e.g., the appointment involving mortgage lending services, as specified within appointment data element 326A).

To facilitate the request via GUI 318, executed programmatic bot 314 may perform operations that, in accordance with the elements of processing logic 310, identify those elements of customer profile data (e.g., as maintained at custodian system 132) that would inform the performance of the customer appointment associated with prioritized appointment data element 326A, and generate corresponding identifiers 334 for each of the requested elements of customer profile data. By way of example, a format or structure of each of identifiers 334 may be consistent with application model 306, which identifies and characterizes the interface elements displayed within one or more display screens of GUI 318, and/or action data 308, which specifies one or more actions capable of performance by executable object 312 during interaction with GUI 318. As such, in some instances, identifiers 334 may facilitate a provisioning, by executable object 312, of additional input to GUI 318 that requested the corresponding elements of customer profile data that inform the performance of the scheduled customer appointment associated with appointment data element 326A and are associated with the corresponding customer (e.g., as identified within customer information 328).

By way of example, the scheduled customer appointment may involve mortgage lending services, and the elements of customer profile data that inform such a customer appointment may include, but are not limited to, a full name of the customer and a current address of the customer. In some instances, executed programmatic bot 314 may perform operations that generate corresponding ones of identifiers 334 for each of the elements of customer profile data described herein (e.g., that inform the performance of the scheduled customer appointment involving mortgage-lending services) based on corresponding portions of application model 306 and/or action data 308. The disclosed embodiments are, however, not limited to these examples of informative customer profile data, and in other instances, executed programmatic bot 314 may identify any additional or alternate element of customer profile that would be appropriate for the corresponding appointment type specified within prioritized appointment data element 326A and that would be accessible to executed programmatic bot 314 via GUI 318.

In some instances, executed programmatic bot 314 may perform operations that generate additional input data, e.g., input data 336, that that identifies and requests, from custodian system 132, the one or more elements of customer profile that inform the performance of the performance of the customer appointment associated with appointment data element 326A. For example, as illustrated in FIG. 3A, executed programmatic bot 314 may package identifiers 334 and all, or a selected subject set of, customer information 328, into corresponding portions of input data 336, which FI computing system 140 may transmit across network 120 to custodian system 132, e.g., as additional input to GUI 138. As illustrated in FIG. 3A, custodian system 132 may receive input data 336, and application front-end 320 of executed application program 316 may process input data 336 provisioned to GUI 318, and may generate a corresponding query 338 for the requested elements of customer profile data maintained at custodian system 132. Query 338 may, for example, include all or a selected portion of identifiers 334 and/or customer information 328 (e.g., that uniquely identifies the customer involved in the scheduled customer appointment associated with prioritized appointment data element 326A), and application front-end 320 may provide query 338 as an input to application back-end 340 of executed application program 316.

Figure 3B:
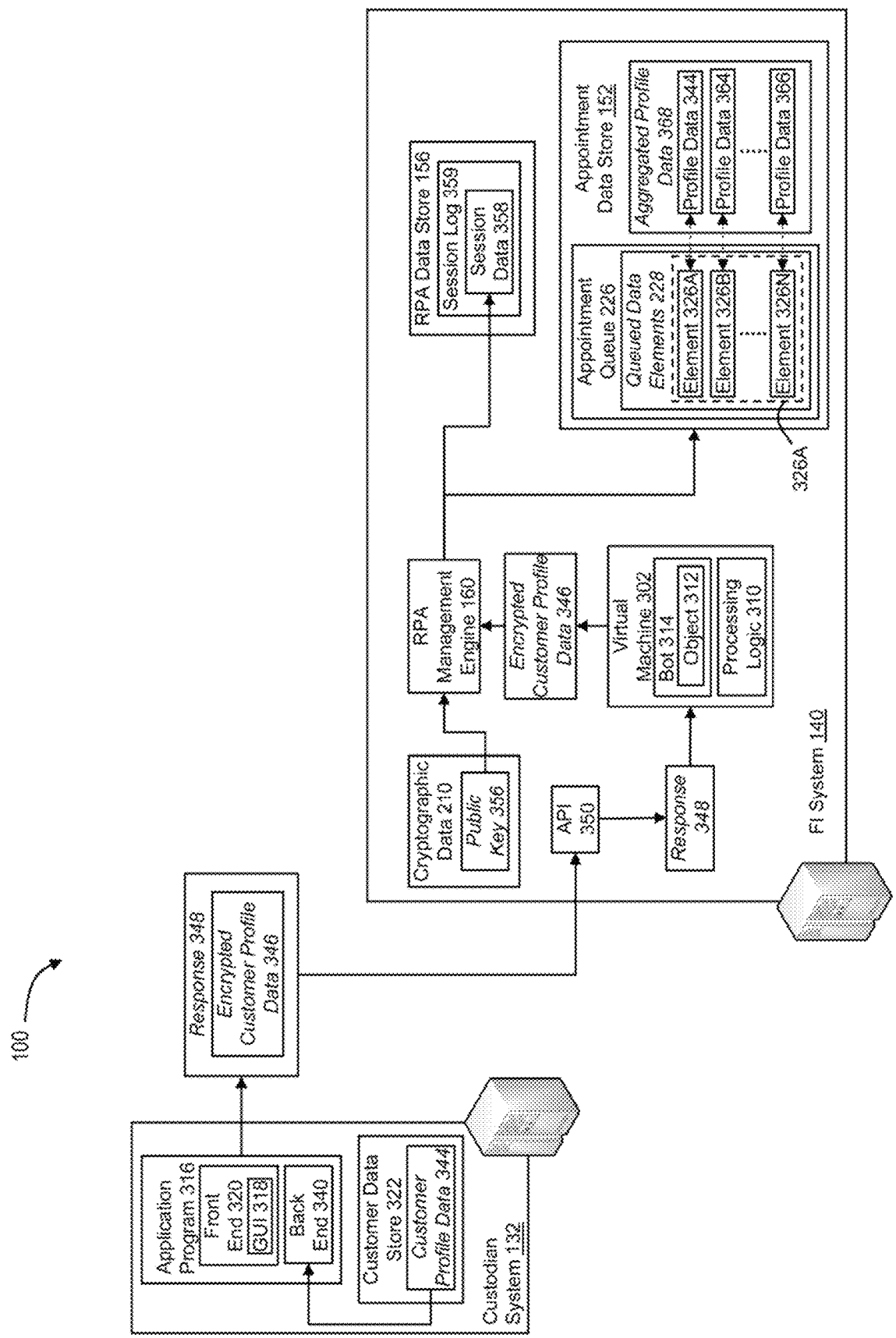

Application back-end 340 may, for example, perform operation that access a local data repository maintained within a tangible, non-transitory memory, e.g., customer data store 322 of FIG. 3A, and identify one or more elements of customer profile data, e.g., customer profile data 344, that are consistent with query 338. By way of example, and as described herein, the elements of customer profile data 344 may inform the performance of the scheduled customer appointment associated with appointment data element 326A, may include, but are not limited to, the full name of the customer and the current address of the customer. Referring to FIG. 3B, application back-end 340 of executed application program 316 may perform operations that extract customer profile data 344 from customer data store 322, and that encrypt customer profile data 344 using, for example, a public cryptographic key associated with, or generated by, FI computing system 140. Application back-end 340 may perform operations that generate a response to query 338, e.g., response 348, and package encrypted customer profile data 346 into a corresponding portion of response 348. Application back-end 340 may perform additional operations that cause custodian system 132 to transmit response 348 across network 120 to FI computing system 140.

A programmatic interface established and maintained by FI computing system 140, such application programming interface (API) 350 associated with virtual machine 302, may receive response 348 (including encrypted customer profile data 346), and may route response 348 to executed virtual machine 302, which may perform operations that cause programmatic bot 314 to provide additional input data to custodian system 132 that logs out of GUI 318, e.g., in accordance with application model 306 and processing logic 310 (not illustrated in FIG. 3A). Executed virtual machine 302 may parse response 348, extract encrypted customer profile data 346, and provide encrypted customer profile data 346 as an input to executed RPA management engine 160.

In some instances, executed RPA management engine 160 may obtain, from cryptographic data 210, a public cryptographic key 356 associated with custodian system 132 or executed application program 316. Using public cryptographic key 356, executed RPA management engine 160 may decrypt encrypted customer profile data 346, e.g., to yield customer profile data 344 associated with prioritized appointment data element 326A, and may perform operations that store customer profile data 344 in association with, and in conjunction with, prioritized appointment data element 326A within corresponding portions of appointment data store 152. Executed RPA management engine 160 may also generate one or more elements of session data 358, which may confirm the successful receipt of customer profile data 344 from custodian system 132 and the storage of customer profile data 344 within appointment data store 152, and may store session data 358 within a corresponding portion of session log 359.

In some instances, and through the implementation of the exemplary RPA-based processes and techniques described herein, FI computing system 140 may obtain one or more elements of customer profile data 344 that are associated with prioritized appointment data element 326A from custodian system 132 based not on interaction with an exposed programmatic interface associated with executed application program 316, but instead based on virtualized interaction between programmatic software robots and a corresponding graphical user interface of generated by executed application program 316, such as GUI 318. Certain of these exemplary processes, which minimize an exposure of the programmatic interface of executed application program 316 to the computing systems and devices operating with environment 100, may reduce a likelihood and/or an impacts of attacks by malicious third parties, and increase a security and confidentiality of the underlying elements of confidential customer profile data maintained at custodian system 132. Moreover, certain of these exemplary processes, when implemented via software robots executed by virtual machines instantiated at FI computing system 140, may increase a security and confidentiality of the acquisition of the elements of customer profile data associated with prioritized appointment data element 326A while reducing an exposure of these acquired elements of customer profile data to additional computing systems and devices associated with or operated by the financial institution within environment 100.

Further, and upon a successful acquisition of the one or more elements of customer profile data 344 that are associated with prioritized appointment data element 326A from custodian system 132 (e.g., that inform the customer appointment involving mortgage lending services and scheduled at a retail branch in Toronto, Canada, for 9:00 a.m. EDT on Apr. 30, 2020), executed programmatic bot 314 may select an additional prioritized appointment data element from allocated subset 326, such as prioritized appointment data element 326B associated with an additional customer appointment scheduled for 10:00 a.m. EDT at a retail branch of the financial institution in Mississauga, Canada to discuss investment planning. In some instances, executed programmatic bot 314 may perform any of the exemplary processes described herein (e.g., in accordance with the elements of processing logic 310) to extract, from prioritized appointment data element 326B, additional customer information that uniquely identifies the additional customer involved in the additional customer appointment and additional appointment type data that identifies the appointment type associated with the additional customer appointment (e.g., retirement planning, etc.).

In some instances, executed programmatic bot 314 may perform any of the exemplary, RPA-based processes and techniques described herein (e.g., in accordance with the elements of processing logic 310) to establish communications with custodian system 132 and to cause executable object 312 to access GUI 318 based on additional elements of credential data associated with FI computing system 140 and additionally, or alternatively, associated with the customer involved in the additional scheduled appointment (e.g., as specified within the customer information extracted from prioritized appointment data element 326B). Based upon a successful authentication of the additional elements of credential data by application program 316 (e.g., using any of the exemplary processes described herein), executed programmatic bot 314 may perform further operations that, consistent with processing logic 310, cause executable object 312 to provide additional input to GUI 318 that identifies and requests one or more additional elements of the customer profile data maintained at custodian system 132 (not illustrated in FIGS. 3A and 3B).

The one or more additional elements of customer profile data may, for example, identify and characterize the customer involved in the additional customer appointment associated with prioritized appointment data element 326B, and may inform a performance of the additional scheduled appointment by the representative of the financial institution. In some instances, not illustrated in FIGS. 3A and 3B, application front-end 320 may receive additional input data representative of the additional input provided to GUI 318 by executable object 312, and may process the additional input data and generate a corresponding query that, when processed by application back-end 340, enables executed application program 316 to extract additional elements of customer profile data from customer data store 322, and to encrypt the additional elements of customer profile data for transmission across network 120 to FI computing system 140, e.g., as a response to the additional input.

Using any of the exemplary processes described herein, executed RPA management engine 160 may perform any of the exemplary processes described herein to extract the additional elements of encrypted customer profile data from the transmitted response, and to decrypt these additional elements of encrypted customer profile data using public cryptographic key 256. For example, the now-decrypted additional elements of customer profile data, e.g., customer profile data 364 of FIG. 3B, may inform the additional customer appointment scheduled for 2:00 p.m. UTC at a retail branch of the financial institution in Mississauga, Canada, and executed RPA management engine 160 may perform further operations that store customer profile data 364 in association with, and in conjunction with, appointment data element 326B within corresponding portions of appointment data store 152. Executed RPA management engine 160 may also generate one or more additional elements of session data, which confirm the successful receipt of customer profile data 364 from custodian system 132 and the storage of customer profile data 344 within appointment data store 152, e.g., in conjunction or association with appointment data element 326B.

In additional instances, not illustrated in FIGS. 3A and 3B, executed RPA management engine 160, virtual machine 302 and executed programmatic bot 314, and executed application program 316 may perform any of the exemplary processes described herein to obtain, from customer data store 322 of custodian system 132 via GUI 318, corresponding elements of customer profile data that are associated with each of the additional or alternate elements of prioritized appointment data within allocated subset 326, and as such, that inform the representative of the financial institution during scheduled appointments associated with each of these additional or alternate elements of prioritized appointment data. By way of example, prioritized appointment data element 326N may be associated with a customer appointment scheduled for 10:00 a.m. EDT in New York, N.Y. involving retirement planning (e.g., the corresponding appointment type), and through the performance of any of the exemplary processes described herein, executed programmatic bot 314 of virtual machine 302 may obtain, from customer data store 322 via GUI 318, corresponding elements of customer profile data 366 that are associated with appointment data element 326N and that inform the provisioning retirement-planning services by the representative of the financial institution during performance of the scheduled appointment.

As illustrated in FIG. 3B, executed RPA management engine 160 may perform operations that store customer profile data 366 in association with, and in conjunction with, prioritized appointment data element 326N within corresponding portions of appointment data store 152. Further, executed RPA management engine 160 may perform similar operations, described herein, that store each additional, or alternate, acquired element of customer profile data within appointment data store 152, e.g., in association with, or in conjunction with, corresponding ones of the prioritized appointment data elements of allocated subset 326.

In some instances, the storage of each of the acquired elements of customer profile data (e.g., elements of customer profile data 344, 364, and 366 described herein) in association with, and in conjunction with each of the prioritized appointment data elements of allocated subset 326 (e.g., prioritized appointment data elements 326A, 326B, . . . , 326N described herein) within appointment data store 152 may establish a set of aggregated elements 368 of customer profile data that inform, either partially or wholly, the performance of each of the customer appointments associated with the prioritized appointment data elements of allocated subset 326. Further, although not illustrated in FIG. 3A or 3B, FI computing system 140 may perform any of the exemplary processes described herein to allocate one or more additional subsets of prioritized and queued appointment data elements 228 to virtual machine, to acquire additional elements of customer profile data associated with the prioritized appointment data elements within each of the one or more allocated additional subsets, and to store the additional elements of customer profile data within appointment data store 152 in association with, or in conjunction with the prioritized and queued appointment data elements of the one or more allocated additional subsets, e.g., establishing additional sets of aggregated elements of customer profile data.

Further, as illustrated in FIGS. 3A and 3B, executed RPA management engine 160 may instantiate a virtual machine, e.g., virtual machine 302, and may allocate a subset of prioritized and queued appointment data elements 228, e.g., subset 326, to virtual machine 302. Further, a programmatic software robot executed by virtual machine 302, e.g., programmatic bot 314, may perform any of the exemplary, RPA-based processes described herein to obtain, from customer data store 322 of custodian system 132 via GUI 318, corresponding elements of customer profile data that are associated with each of the discrete elements of prioritized appointment data within allocated subset 326, e.g., appointment data elements 326A, 326B, . . . , 326N. The disclosed embodiments are, however, not limited to processes through which executed RPA management engine 160 instantiates a single virtual machine, such as virtual machine 302.

In other examples, not illustrated in FIG. 3A or 3B, executed RPA management engine 160 may instantiate any number of additional or alternate virtual machines for execution by FI computing system 140, and may provision, to each of the additional or alternate virtual machines, object information 304, which include includes application model 306 and action data 308, and processing logic 310. Executed RPA management engine 160 may also allocate a corresponding subset of prioritized and queued appointment data elements 228 to each of these additional or alternate instantiated virtual machines. Further, a programmatic software robot executed by each of the additional or alternate instantiated virtual machines (e.g., as established by application model 306 and action data 308) may perform any of the exemplary processes described herein (e.g., consistent with processing logic 310) to obtain, from customer data store 322 via GUI 318, one or more additional elements of customer profile data associated each of the prioritized appointment data elements within a respective one of the allocated subsets. Executed RPA management engine 160 may also perform operations, such as those described herein, to store each of the elements of customer profile data obtained by the additional, or alternate, instantiated virtual machines within appointment data store 152, e.g., in association with, or in conjunction with, corresponding ones of the prioritized appointment data elements.

Through the implementation of these exemplary, RPA-based processes and techniques, FI computing system 140 may obtain customer profile data associated with each of prioritized and queued appointment data elements 228. In some instances, elements of customer profile data may inform, and may facilitate, the provisioning of financial services by representatives of the financial institution during a performance of the customer appointments associated with each of prioritized and queued appointment data elements 228. In other instances, the performance of, and the provisioning of financial services during, certain types of scheduled customer appointments may be informed not only by the exemplary elements of customer profile data, but by additional elements of data that characterize customer interaction with the financial institution, with one or more additional financial institutions, or with one or more governmental, judicial, or regulatory entities.

For example, during one or more of the scheduled appointments, a representative of the financial institution may discuss one or more mortgage services available to corresponding customers. To fully inform the provision of these mortgage services to each of the customers, the representative of the financial institution may require not only information that identifies and characterizes these customers (e.g., the elements of customer profile data described herein), but also additional information that characterizes the interaction between the customers and various financial institution (such as, but not limited to, data identifying accounts, lines of credit, or other mortgages held by these customers, current balances, payment histories, or default behavior associated with the accounts, lines of credit, or other mortgages, etc.), and further information that characterizes the interaction between these customers and one or more governmental, judicial, or regulatory entities (e.g., data identifying tax delinquencies, judicial liens, etc.). In some instances, described below in reference to FIGS. 4A-4C, one or more of the exemplary virtual machines instantiated or cloned by RPA management engine 160, such as virtual machine 302, may execute a plurality of programmatic bots that, in accordance with corresponding elements of processing logic and application models, perform operations that obtain, from corresponding ones of custodian systems 130, elements of confidential customer profile data, customer account data, and customer reporting data associated with each of the allocated elements of appointment data, e.g., allocated subset 326 of prioritized and queued appointment data elements 228.

Figure 4A:
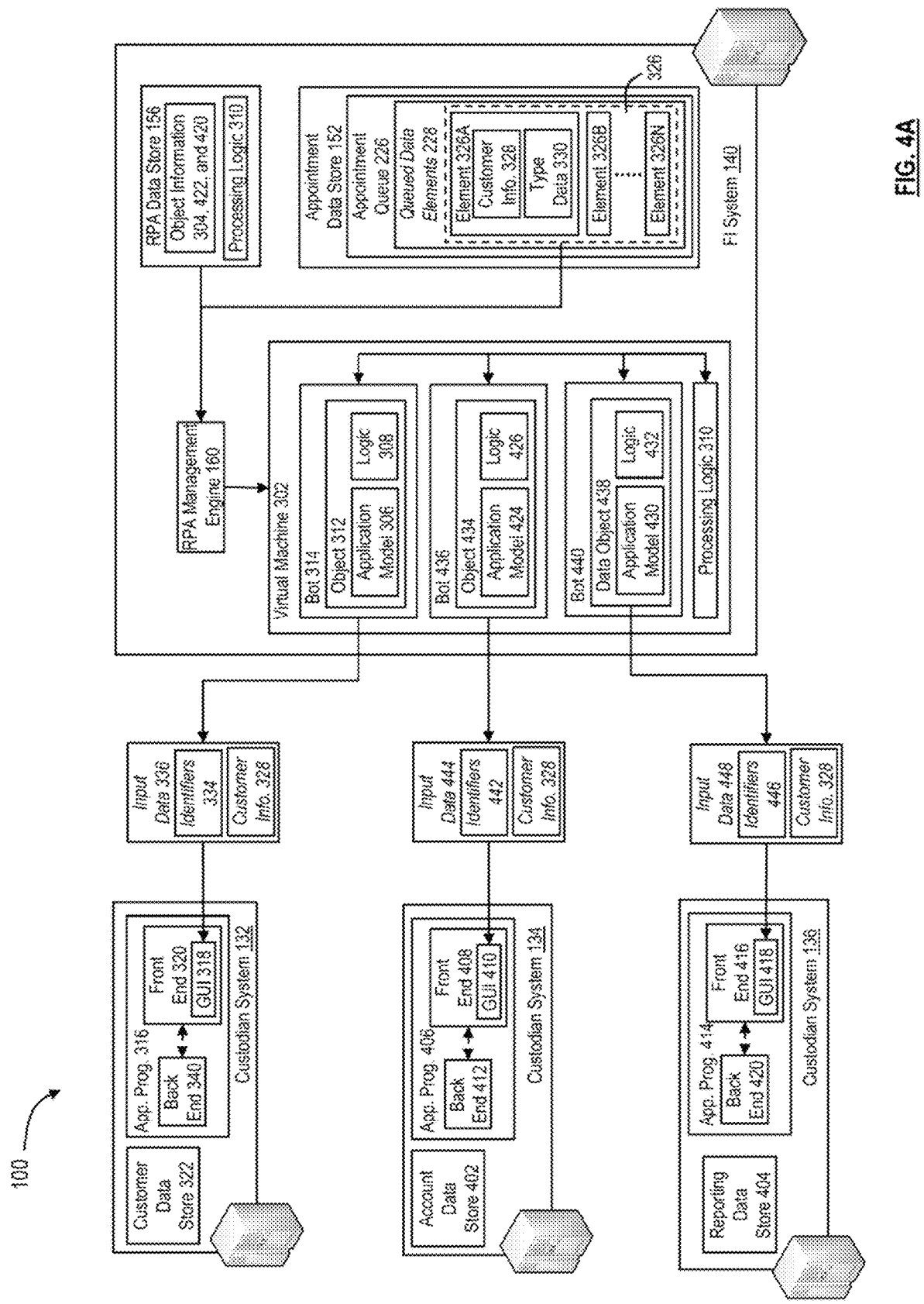

For example, as illustrated in FIG. 4A, custodian systems 130 may include custodian system 132, which maintains customer data store 322. Custodian systems 130 may also include custodian system 134, which maintains account data store 402, and custodian system 136, which maintains reporting data store 404. In some instances, account data store 402 may include elements of confidential account data that identify and characterize financial services accounts held by one or more customers of the financial institution and prior transactions involving these financial services accounts, and custodian system 134 may be associated with the financial institution (e.g., that maintains FI computing system 140) or alternatively, with one or more financial institutions capable of issuing the financial services accounts to the customers. Further, reporting data store 404 may include elements of confidential reporting data that identify and characterize interactions between one or more of the customers of the financial institution and a judicial, governmental, or regulatory entity, which may be associated with or maintain custodian system 136.

As described herein, each of custodian systems 132, 134, and 136 may execute a corresponding application program having an application front end exposed to one or more computing devices or systems across network 120 via a corresponding graphical user interface (GUI) or digital portal, and an application back end that accesses corresponding elements of confidential customer profile data, confidential account data, and confidential customer reporting data (e.g., based on commands generated by the application front end in response to interaction with the corresponding GUI or digital portal). For example, custodian system 132 may execute application program 316, and application front-end 320 of executed application program 316 may be exposed to FI computing system 140 via GUI 318. Further, and as described herein, application back-end 340 of executed application program 316 may access corresponding elements of confidential customer profile data (e.g., as maintained within customer data store 322) based on commands generated by application front-end 320 in response to interaction with GUI 318.

Further, as illustrated in FIG. 4A, custodian systems 134 and 136 may execute an additional application programs, such as, but not limited to, a respective one of application program 406 and application program 414. For example, an application front-end 408 of executed application program 406 may be exposed to FI computing system 140 via a corresponding GUI, such as a GUI 410, and an application back-end 412 of executed application program 406 may access corresponding elements of confidential customer account data (e.g., as maintained within account data store 402) based on commands generated by application front-end 408 in response to interaction with GUI 410. Further, and by way of example, an application front-end 416 of executed application program 414 may be exposed to FI computing system 140 via an additional GUI, such as a GUI 418, and an application back-end 420 of executed application program 414 may access corresponding elements of confidential customer reporting data (e.g., as maintained within reporting data store 404) based on commands generated by application front-end 416 in response to interaction with GUI 418. The disclosed embodiments are, however, not limited to custodian systems 132, 134, and 136 maintaining respective ones of customer data store 322, account data store 402, and reporting data store 404, and executing corresponding ones of application programs 316, 406, and 414. In other instances, FI computing system 140 may access elements of confidential customer profile data, account data, or reporting data maintained by any additional or alternate one of custodian systems 130 via corresponding GUIs or digital portals, e.g., using any of the exemplary processes described herein.

In some examples, executed RPA management engine 160 may provision to each of the one or more instantiated or cloned virtual machines, including instantiated virtual machine 302, discrete elements of object information that, when processed by each of the virtual machines, enable each of the virtual machines to generate an corresponding executable object and to establish a programmatic software robot that includes the corresponding executable object. For example, and as described herein, RPA management engine 160 may provision object information 304 (including application model 306 and action data 308) to virtual machine 302, which may perform any of the exemplary processes described herein to generate executable object 312 based on application model 306 and action data 308, and that establish programmatic bot 314 that includes executable object 312.

As illustrated in FIG. 4A, RPA management engine 160 may perform additional operations that provision, to instantiated virtual machine 302, object information 422 (which includes application model 424 and action data 426) and object information 428 (which includes application model 430 and action data 432), along with the one or more elements of processing logic 310 described herein. In some instances, virtual machine 302 may process object information 422 and perform operations that generate executable object 434 based on application model 424 and action data 426, and that establish programmatic bot 436 that includes executable object 434. For example, application model 424 may expose executable object 434 to application program 406 executed by custodian system 134, and may identify and characterize interface elements displayed within one or more display screens of GUI 410 generated and presented by front-end 408 of executed application program 406. Further, and as described herein, application back-end 412 of executed application program 406 may perform any of the exemplary processes described herein to selectively provision, or deny, requests to access to the elements of confidential customer account data received by application front-end 408, e.g., based on input to the interface elements of GUI 410.

Further, in some examples, virtual machine 302 may process object information 428 and perform operations that generate executable object 438 based on application model 430 and action data 432, and that establish programmatic bot 440 that includes executable object 438. In some instances, application model 430 may expose executable object 438 to application program 414 executed by custodian system 136, and may identify and characterize interface elements displayed within one or more display screens of GUI 418 generated and presented by front-end 416 of executed application program 414. As described herein, application back-end 420 of executed application program 406 may perform any of the exemplary processes described herein to selectively provision, or deny, requests to access to the elements of confidential customer reporting data received by application front-end 416, e.g., based on input to the interface elements of GUI 418.

RPA management engine 160 may also perform any of the exemplary processes described herein to allocate, to virtual machine 302, subset 326 of prioritized and queued appointment data elements 228 that includes, but is not limited to, discrete, prioritized appointment data elements 326A, 326B, . . . , 326N. In some instances, the one or more elements of processing logic 310 may encode sequential operations that, when performed by each of executed programmatic bot 314, 436, and 440, cause executable objects 312, 434, and 438 to access a graphical user interface (GUI) or digital portal of a corresponding one of executed application programs 316, 406, and 414 (e.g., respective ones of GUIs 318, 410, and 418), and to request and receive, via the accessed GUIs or digital portals, one or more elements of confidential customer data associated with each of the appointment data elements within allocated subset 326, e.g., prioritized appointment data elements 326A, 326B, . . . , 326N.

For example, RPA management engine 160, virtual machine 302 and executed programmatic bot 314, and executed application program 316 may perform any of the exemplary processes described herein to obtain, from customer data store 322 of custodian system 132 via GUI 318, elements of customer profile data 344 associated with appointment data element 326A, and to store customer profile data 344 within appointment data store 152, e.g., as a portion of aggregated customer profile data 368 associated with appointment data element 326A. Further, RPA management engine 160, virtual machine 302 and executed programmatic bot 314, and executed application program 316 may also perform any of the exemplary processes described herein to obtain, from customer data store 322 of custodian system 132 via GUI 318, corresponding elements of customer profile data that are associated with each additional, or alternate, elements of prioritized appointment data within allocated subset 326, including elements of customer profile data 364 and 366 associated with respective ones of appointment data elements 326B and 326N, and to store customer profile data 364 and 366 within appointment data store 152, e.g., as portions of aggregated customer profile data 368 associated with respective ones of appointment data elements 326B and 326N.

Further, using any of the exemplary processes described herein, and consistent with the elements of processing logic 310, each of executed programmatic bots 436 and 440 may select, from allocated subset 326, appointment data element 326A, and may parse appointment data element 326A to obtain customer information 328 appointment type data 330. By way of example, executed programmatic bot 436 may establish communications with custodian system 134, and may perform similar operations that cause executable object 434 to access GUI 410 associated with executed application program 406. Executed programmatic bot 440 may also establish communications with custodian system 136, and may perform corresponding operations that cause executable object 438 to access GUI 410 associated with executed application program 406. In some instances, not illustrated in FIG. 4A, executed programmatic bots 436 and 440 may perform any of the exemplary processes described herein to provision, to corresponding ones of GUIs 410 and 418, one or more elements of credential data associated with FI computing system 140 and additionally, or alternatively, with the customer involved in the scheduled appointment (e.g., associated with selected appointment data element 326A).

Based upon a successful authentication of the elements of credential data by application program 406, executed programmatic bot 436 may perform any of the exemplary processes described herein to provide, as input to GUI 410, information that identifies and requests one or more elements of the customer account data maintained at custodian system 134. For example, to facilitate the request via GUI 410, executed programmatic bot 436 may perform any of the exemplary processes described herein that, in accordance with the elements of processing logic 310, identify those elements of customer account data (e.g., as maintained at custodian system 134) that would inform the performance of the customer appointment associated with prioritized appointment data element 326A (e.g., the customer appointment involving mortgage lending services and scheduled at a retail branch in Toronto, Canada, for 9:00 a.m. EDT on Apr. 30, 2020), and generate corresponding identifiers 442 for each of the requested elements of customer account data. In some instances, executed programmatic bot 436 may perform any of the exemplary processes described herein to package identifiers 442 and all, or a selected subject set of, customer information 328, into corresponding portions of input data 444, which FI computing system 140 may transmit across network 120 to custodian system 132, e.g., as input to GUI 410.

In some instances, a format or structure of each of identifiers 442 may be consistent with application model 424, which identifies and characterizes the interface elements displayed within one or more display screens of GUI 410, and/or action data 426, which specifies one or more actions capable of performance by executable object 434 during interaction with GUI 410. By way of example, the scheduled customer appointment may involve mortgage lending services, and the elements of customer account data that inform such a customer appointment may include, but are not limited to, an identifier of one or more financial services accounts held by the customer (e.g., a tokenized account number, an actual account number, an account type, etc.), a current account balance and amount of available credit associated with each of the financial services accounts, and additionally, or alternatively, a status of with each of these financial services accounts (e.g., a current payment status, instances of default, etc.).

Further, and as described herein, examples of these financial services accounts may include, but are not limited to, a credit card account, a deposit account (e.g., a savings account, a checking account), an investment or brokerage account, a retirement account, a mortgage, or a secured or unsecured line or credit issued to the customer by the financial institution associated with custodian system 134. The disclosed embodiments are, however, not limited to these examples of informative customer account data, or these exemplary financial services accounts, and in other instances, executed programmatic bot 436 may identify any additional or alternate element of customer account data, associated with any additional or alternate financial services account, that would be appropriate for the corresponding appointment type specified within prioritized appointment data element 326A and that would be accessible to executed programmatic bot 436 via GUI 410.

Additionally, and based upon a successful authentication of the elements of credential data by application program 414, executed programmatic bot 440 may perform any of the exemplary processes described herein to provide, as input to GUI 418, information that identifies and requests one or more elements of the customer reporting data maintained at custodian system 136. For example, to facilitate the request via GUI 418, executed programmatic bot 440 may perform any of the exemplary processes described herein that, in accordance with the elements of processing logic 310, identify those elements of customer reporting data (e.g., as maintained at custodian system 136) that would inform the performance of the customer appointment associated with prioritized appointment data element 326A, and generate corresponding identifiers 446 for each of the requested elements of customer account data. In some instances, executed programmatic bot 440 may perform any of the exemplary processes described herein to package identifiers 446 and all, or a selected subject set of, customer information 328, into corresponding portions of input data 448, which FI computing system 140 may transmit across network 120 to custodian system 136, e.g., as input to GUI 418.

As described herein, a format or structure of each of identifiers 446 may be consistent with application model 430, which identifies and characterizes the interface elements displayed within one or more display screens of GUI 418, and/or action data 432, which specifies one or more actions capable of performance by executable object 438 during interaction with GUI 418. By way of example, the elements of customer reporting data that inform the scheduled customer appointment involving mortgage lending services may include, but are not limited to, data identifying discrete interactions between the customers one or more of a judicial entity (e.g., traffic citations involving the customer, judgments entered against the customer, etc.), a governmental entity (e.g., a tax lien involving the customer, etc.), a regulatory entity, or a reporting agency (e.g., a credit report associated with the customer, etc.). The disclosed embodiments are, however, not limited to these examples of informative customer reporting data, and in other instances, executed programmatic bot 440 may identify any additional or alternate element of customer reporting data that would be appropriate for the corresponding appointment type specified within prioritized appointment data element 326A and that would be accessible to executed programmatic bot 440 via GUI 418.

Figure 4B:
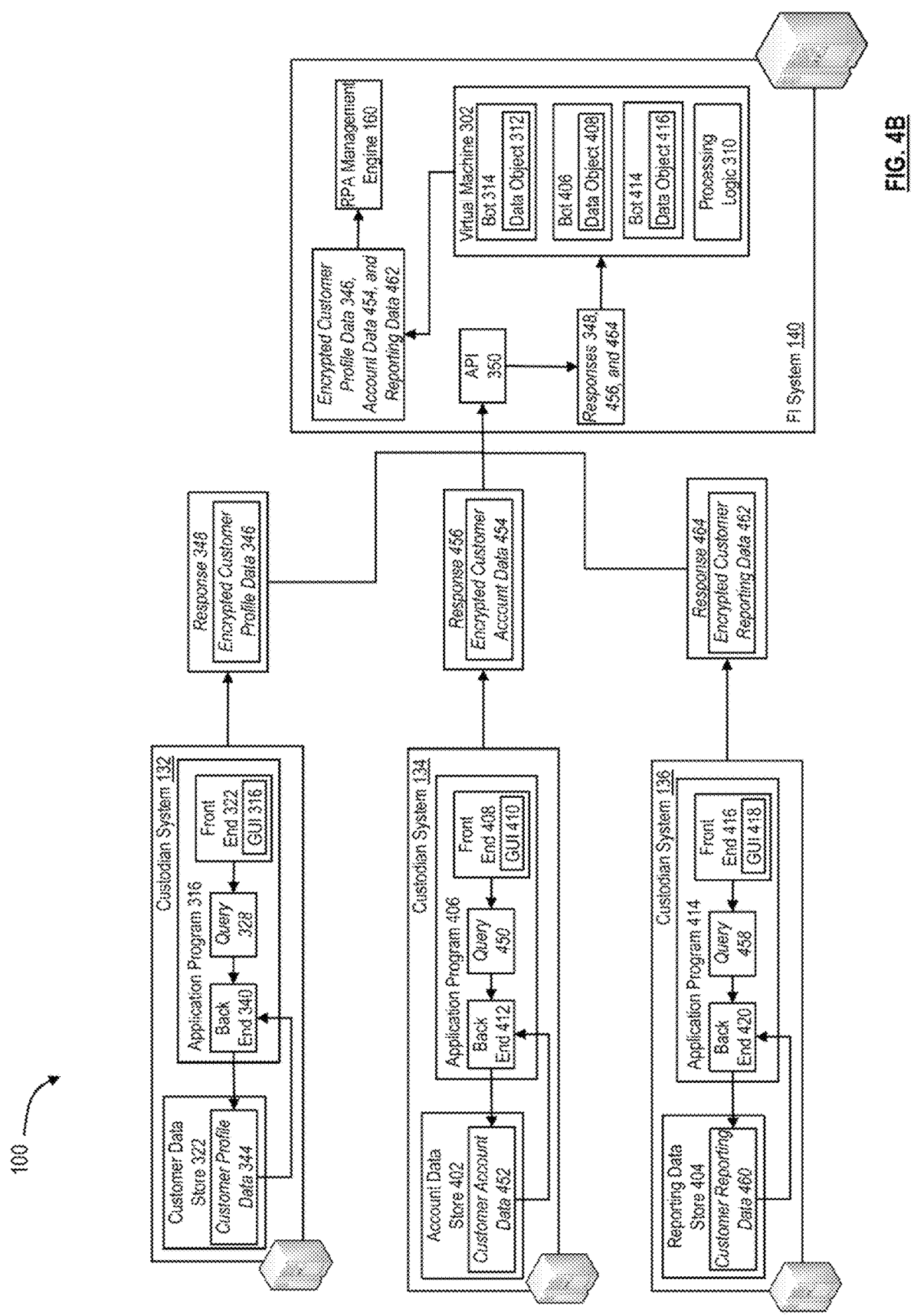

Referring to FIG. 4B, custodian system 134 may receive input data 444 from FI computing system 140, e.g., as provisioned to GUI 410 by executed programmatic bot 436. In some instances, application front-end 408 of executed application program 406 may process input data 444, and may generate query 450 for the requested elements of customer account data maintained at custodian system 134. Query 450 may, for example, include all or a selected portion of identifiers 442 and/or customer information 328 (e.g., that uniquely identifies the customer involved in the scheduled customer appointment associated with prioritized appointment data element 326A), and application front-end 408 may provide query 450 as an input to application back-end 412 of executed application program 406.

Application back-end 412 may, for example, perform operation that access account data store 402, and extract one or more elements of customer account data 452, that are consistent with query 450 and as such, that inform the performance of the scheduled customer appointment associated with appointment data element 326A (e.g., customer appointment involving mortgage lending services and scheduled at a retail branch in Toronto, Canada, for 9:00 a.m. EDT on Apr. 30, 2020). As described herein, the extracted elements of customer account data 452 may include, but are not limited to, an identifier of one or more financial services accounts held by the customer (e.g., a tokenized account number, an actual account number, an account type, etc.), a current account balance and amount of available credit associated with each of the financial services accounts, and additionally, or alternatively, a status of with each of these financial services accounts (e.g., a current payment status, instances of default, etc.). Further, application back-end 412 may perform operations that encrypt customer account data 452 using, for example, the public cryptographic key associated with, or generated by, FI computing system 140, and package encrypted customer account data 454 into a corresponding portion of response 456. Application back-end 412 may perform additional operations that cause custodian system 134 to transmit response 456 across network 120 to FI computing system 140.

Further, as illustrated in FIG. 4B, custodian system 136 may receive input data 448 from FI computing system 140, e.g., as provisioned to GUI 418 by executed programmatic bot 440. In some instances, application front-end 416 of executed application program 414 may process input data 448, and may generate query 458 for the requested elements of customer reporting data maintained at custodian system 136. Query 458 may, for example, include all or a selected portion of identifiers 446 and/or customer information 328 (e.g., that uniquely identifies the customer involved in the scheduled customer appointment associated with prioritized appointment data element 326A), and application front-end 416 may provide query 458 as an input to application back-end 420 of executed application program 414.

Application back-end 420 may, for example, perform operations that access reporting data store 404, and extract one or more elements of customer reporting data 460 that are consistent with query 458 and as such, that inform the performance of the scheduled customer appointment associated with prioritized appointment data element 326A. As described herein, the extracted elements of customer account data 452 may, for example, identify discrete interactions between the customers one or more of a judicial entity (e.g., traffic citations involving the customer, judgments entered against the customer, etc.), a governmental entity (e.g., a tax lien involving the customer, etc.), a regulatory entity, or a reporting agency (e.g., a credit report associated with the customer, etc.). Further, application back-end 420 may perform operations that encrypt customer reporting data 460 using, for example, the public cryptographic key associated with, or generated by, FI computing system 140, and package encrypted customer reporting data 462 into a corresponding portion of response 464. Application back-end 420 may perform additional operations that cause custodian system 136 to transmit response 464 across network 120 to FI computing system 140. Further, although not illustrated in FIG. 4B, executed programmatic bots 436 and 440 may perform additional perform actions or operations specified by the elements of processing logic, such as, but not limited to, logging out the corresponding GUI or digital portal, requesting and retrieving elements of the confidential, customer-specific data, and logging out of corresponding ones of GUIs 410 and 418.

One or more programmatic interfaces established and maintained by FI computing system 140, such as API 350 associated with virtual machine 302, may receive each of responses 456 and 464 from corresponding ones of custodian systems 134 and 136. In some instances, virtual machine 302 may parse each of responses 456 and 464, and may perform operations that extract, from a respective one of responses 456 and 464, encrypted customer account data 454 and encrypted customer reporting data 462, which virtual machine 302 may provide as inputs to executed RPA management engine 160.

Figure 4C:
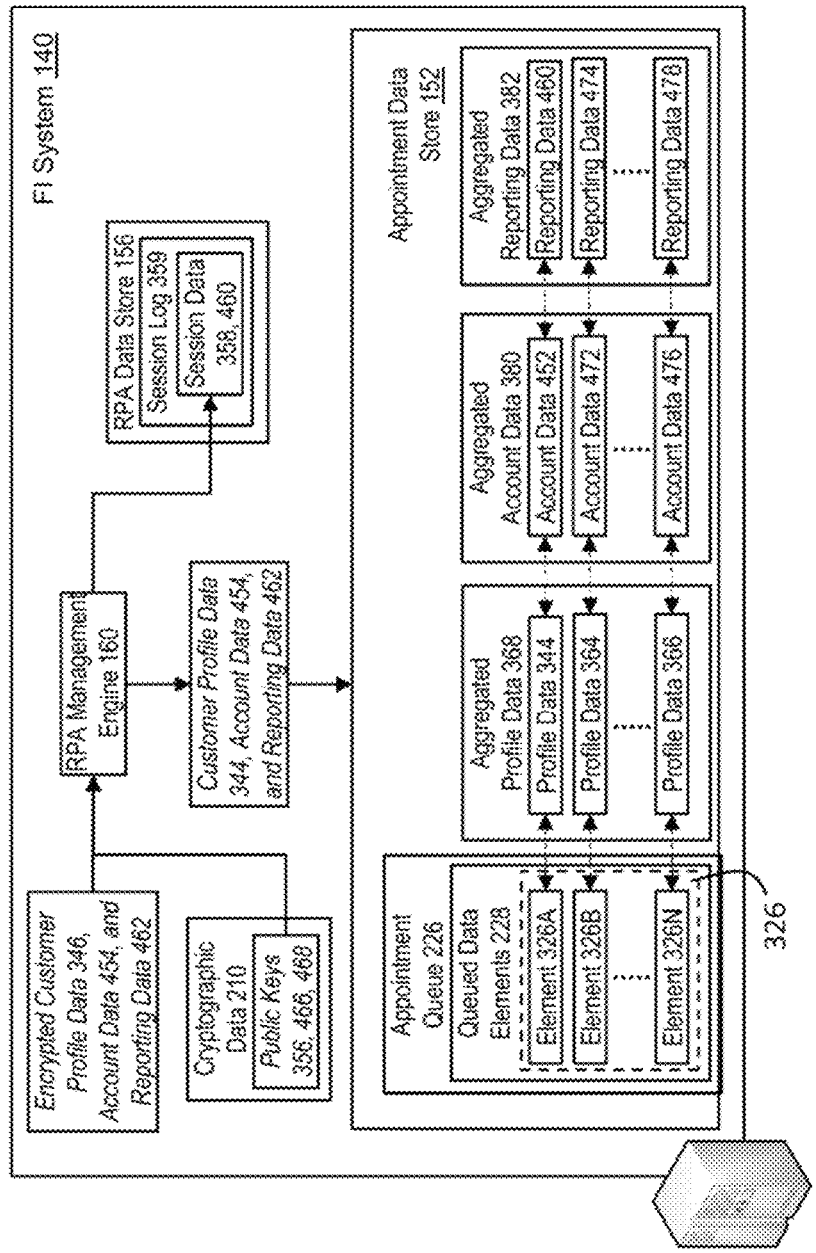

Referring to FIG. 4C, executed RPA management engine 160 may receive encrypted customer account data 454 and encrypted customer reporting data 462, e.g., as inputs from virtual machine 302. In some instances, executed RPA management engine 160 may obtain, from cryptographic data 210, a public cryptographic key 466 associated with custodian system 134 (or executed application program 406) and public cryptographic key 468 associated with custodian system 136 (or executed application program 414). Using public cryptographic key 466, executed RPA management engine 160 may decrypt encrypted customer account data 454, e.g., to yield customer account data 452 associated with prioritized appointment data element 326A, and using public cryptographic key 468, executed RPA management engine 160 may also decrypt encrypted customer reporting data 462, e.g., to yield customer reporting data 460 associated with prioritized appointment data element 326A.

In some instances, executed RPA management engine 160 may perform operations that store customer account data 452 and customer reporting data 460 within corresponding portions of appointment data store 152, e.g., in associated with, and in conjunction with both stored customer profile data 344 and prioritized appointment data element 326A. Further, executed RPA management engine 160 may perform any of the exemplary processes described herein to generate one or more elements of session data 470, which may confirm the successful receipt of customer account data 452 from custodian system 134 and of customer reporting data 460 from custodian system 136, and the storage of customer account data 452 and customer reporting data 460 within appointment data store 152, e.g., in conjunction or association with prioritized appointment data element 326A and customer profile data 344.

Executed programmatic bots 436 and 440 may also perform any of the exemplary, RPA-based processes and techniques described herein (e.g., in accordance with the elements of processing logic 310) to: (i) establish communications with corresponding ones of custodian systems 134 and 136; and (ii) based on interactions with corresponding ones of GUIs 410 and 418, to request and receive elements of confidential customer data (e.g., respective elements of the customer account and reporting data described herein) maintained by corresponding ones of custodian systems 134 and 136 and associated with each additional, or alternate, appointment data element within allocated subset 326. For example, executed programmatic bots 436 and 440 may perform any of the exemplary processes described herein to obtain, from corresponding ones of custodian systems 134 and 136, additional elements of encrypted customer account and reporting data associated with appointment data element 326B (e.g., the additional customer appointment scheduled for 10:00 a.m. EDT in Mississauga, Canada, and involving investment planning) and appointment data element 326N (e.g., the additional customer appointment scheduled for 10:00 a.m. EDT in New York, N.Y., involving retirement planning.

In some instances, virtual machine 302 may receive the additional elements of encrypted customer account and reporting data from respective ones of custodian systems 134 and 136 (e.g., via API 350), and RPA management engine 160 may perform any of the exemplary processes described herein to decrypt the additional elements of encrypted customer account and reporting data (e.g., using respective ones of public cryptographic keys 466 and 468, described herein). For example, as illustrated in FIG. 4C, RPA management engine 160 may store now-decrypted elements of customer account data 472 and customer reporting data 474 within corresponding portions of appointment data store 152, e.g., in associated with, and in conjunction with prioritized appointment data element 326B, and may store now-decrypted elements of customer account data 476 and customer reporting data 478 within corresponding portions of appointment data store 152, e.g., in associated with, and in conjunction with prioritized appointment data element 326N. Further, executed RPA management engine 160 may perform any of the exemplary processes described herein to generate one or more elements of session data (not illustrated in FIG. 4C), which may confirm the successful receipt of the elements of customer account and reporting data associated with each of the additional, or alternate, appointments data elements within allocated subset 326.

In some instances, the storage of each of the acquired elements of customer account data (e.g., elements of customer account data 452, 472, and 476 described herein), and the storage of each of the acquired elements of customer reporting data (e.g., elements of customer reporting data 460, 474, and 478 described herein), in association with, and in conjunction with each of the prioritized appointment data elements of allocated subset 326 (e.g., prioritized appointment data elements 326A, 326B, . . . , 326N described herein) within appointment data store 152 may establish aggregated elements 480 of customer account data and aggregated elements 482 of customer reporting data that inform, either partially or wholly, the performance of each of the customer appointments associated with the prioritized appointment data elements of allocated subset 326. Further, although not illustrated in FIG. 4A-4C, FI computing system 140 may perform any of the exemplary processes described herein to allocate one or more additional subsets of prioritized and queued appointment data elements 228 to virtual machine 302 (or to additional or alternate instantiated or cloned virtual machines), to acquire additional elements of customer account and reporting data associated with the prioritized appointment data elements within each of the one or more allocated additional subsets, and to store the additional elements of customer account and reporting data within appointment data store 152 in association with, or in conjunction with the prioritized and queued appointment data elements of the one or more allocated additional subsets, e.g., establishing additional sets of aggregated elements of customer account or reporting data.

Through certain of the exemplary processes described herein, one or more virtual machines instantiated by or cloned at FI computing system 140, such virtual machine 302, may access programmatically one or more of the data repositories (e.g., as maintained by corresponding ones of custodian systems 130) through a corresponding GUI or digital portal in accordance with respective application models and elements of processing logic, and may receive and request elements of confidential customer profile, account, or reporting data that are associated with corresponding elements of prioritized and queued appointment data (e.g., as maintained within appointment queue 226), and as such, that inform the performance of customer appointment associated with each of the elements of prioritized and queued appointment data. Further, and as described below in reference to FIGS. 5A-5D, FI computing system 140 may perform operations that identify an appointment-specific document template associated with, and appropriate to, each of the elements of prioritized and queued appointment data maintained within appointment queue 226), that populate each of the appointment-specific document templates with selected elements of customer profile data, customer account data, and/or customer reporting data.

By populating each of the appointment-specific document templates with the selected elements of the customer profile, account, and/or reporting data, certain of the exemplary processes described herein enable FI computing system 140 to generate appointment-specific guidance documents that provide customer profile, account, and/or reporting data that informs the provisioning of financial services by representatives of the financial institution during the customer appoints associated with the prioritized and queued elements of appointment data. As described herein, each of the generated appointment-specific guidance documents may be characterized by a common document format (e.g., a portable document format (PDF) and as such, may be accessed and viewed by the representatives of the financial institution at corresponding retail locations using a variety of computing devices and systems, such as, but not limited to, fully-functional desktops computers, handheld or tablet computers, and smartphones.

Further, FI computing system 140 may perform one or more of the exemplary processes described herein to generate, for each of the retail locations of the financial institution, an encrypted document file that includes each of the guidance documents associated with scheduled appointments at the corresponding retail location during the future temporal interval, e.g., the Apr. 30, 2020, business day of the financial institution. Through the transmission of a single data file of encrypted guidance documents to a computing system or device of each retail branch of the financial institution, certain of the exemplary processes described herein may reduce an exposure of the guidance documents, and the elements of confidential customer profile, account, or reporting data included therein, during transmission to the computing systems of the retail branches, and such, may reduce, or eliminate, opportunities for breach or attack by malicious third parties during provisioning of the encrypted guidance documents to branch systems 110.

Figure 5A:
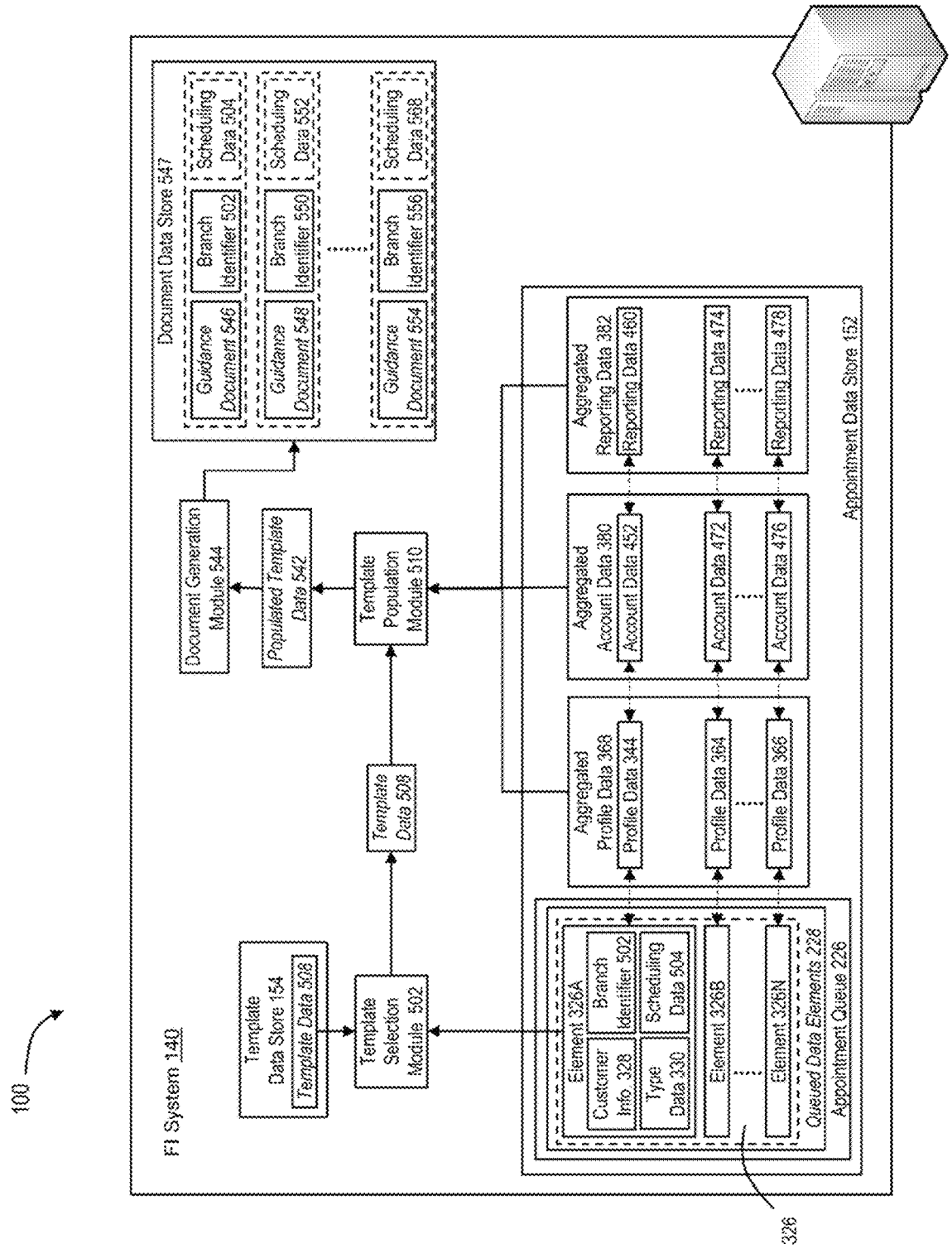

Referring to FIG. 5A, FI computing system 140 may execute a template selection module 502, which perform operations that access appointment data store 152 and select one of the prioritized and queued elements of appointment data maintained within appointment queue 226. For example, executed template selection module 502 may select appointment data element 326A from appointment queue 226, and appointment data element 326A may be associated with, and may characterize, the customer appointment involving mortgage lending services and scheduled at the retail branch of the financial in Toronto, Canada, for 9:00 a.m. EDT (1:00 p.m. UTC) on Apr. 30, 2020. As described herein, appointment data element 326A may include customer information 328, which uniquely identifies the customer involved in the scheduled customer appointment, and appointment type data 330, which identifies the appointment type associated with the customer appointment. Further, and as illustrated in FIG. 5A, appointment data element 326A may also include branch identifier 504, which uniquely identifies the retail location of the financial institution in Toronto, Canada (e.g., a unique alphanumeric identifiers assigned to the retail location by the financial institution, etc.), and scheduling data 506, which specifies the time, date, and/or geographic location of the scheduled customer appointment (e.g., 9:00 a.m. EDT on Apr. 30, 2020, in Toronto, Canada).

Executed template selection module 502 may also access template data store 154, and obtain one or more elements of template data 508, which identify and characterize a document template that, when processed by FI computing system 140, facilitate a generation of a guidance document that informs the provisioning of mortgage lending services during the scheduled customer appointment associated with selected appointment data element 326A. For example, and as described herein, template data store 154 may maintain a plurality of elements of template data, each of which identify and characterize a corresponding candidate document template. Further, and by way of example, one of the more of the candidate document templates may be specific to a particular type of customer appointment (e.g., mortgage lending services, investment planning, tax planning, retirement planning, etc.), and the elements of template data that identify and characterize these type-specific document templates (e.g., as maintained within template data store 154) may include an identifier of the corresponding, specified appointment type.

In some instances, executed template selection module 502 may access appointment type data 330 within selected appointment data element 326A, and based on appointment type data 330, determine that selected appointment data element 326A is associated with a customer appointment involving mortgage lending services. Further, and based the identifier of the specified appointment type, executed template selection module 502 may determine that the candidate document template identified and characterized by template data 508 is associated with mortgage lending services and as such, is consistent with, and appropriate to, the scheduled customer appointment associated with selected appointment data element 326A. As illustrated in FIG. 5A, executed template selection module 502 may extract template data 508 from template data store 154, and provide extracted template data 508, and in some instances, branch identifier 504 and/or scheduling data 506, as input to a template population module 510 executed by FI computing system 140.

The disclosed embodiments are, however, not limited to document templates, and corresponding elements of template data, that are specific to particular types of customer appointment (e.g., mortgage lending services, investment planning, tax planning, retirement planning, etc.). In other instances, one or more of the document templates, and corresponding elements of template data maintained within template data store 152, may be specific to a particular customer, a particular retail branch, a particular appointment location, or any additional, or alternate, appointment characteristic appropriate to appointment data element 326A, the corresponding scheduled customer appointment, or the financial institution. Additionally, in some instances, one or more of the document templates, and corresponding elements of template data maintained within template data store 152, may be specific to combinations of appointment characteristics, such as, but not limited to, the appointment type (e.g., as specified within appointment type data 330) in combination with one, or more, of the customer (e.g., as specified within customer information 328), the retail branch (e.g., as specified by branch identifier 504), or the appointment location (e.g., as specified within scheduling data 506). Further, executed template selection module 502 may perform any of the exemplary processes described herein to identify and extract one or more elements of template data associated with selected appointment data element 326A from template data store 154 based any portion of customer information 328, appointment type data 330, branch identifier 504, and/or scheduling data 506.

Referring back to FIG. 5A, executed template population module 510 may receive template data 508 and in some instances, one or more of branch identifier 504 or scheduling data 506, as inputs from executed template selection module 502. In some instances, executed template population module 510 may perform operations that process template data 508 and populate portions of template data 508 with elements of confidential customer data that inform the customer appointment associated with selected appointment data element 326A, e.g., the selected customer appointment involving mortgage lending services and scheduled at the retail branch in Toronto, Canada, for 9:00 a.m. EDT on Apr. 30, 2020. For example, the elements of the confidential, appointment-specific data may include, but are not limited to, branch identifier 504, portions of scheduling data 506, or one or more elements of aggregated customer profile data 368, aggregated customer account data 480, and/or aggregated customer reporting data 482 associated with selected appointment data element 326A (e.g., as maintained in association with, or in conjunction with, appointment data element 326A within appointment data store 152).

For example, template data 508 may specify, or include, one or more elements of digital content for inclusion in the corresponding, appointment-specific guidance document (e.g., elements of textual content, graphical content, etc.), and may also include formatting data that establishes visual characteristics (e.g., a font size of the textual content) and/or positions of the one or more elements of digital content within the corresponding guidance document. Further, template data 508 may include, at corresponding positions within the digital content, placeholder data (e.g., metadata pointers or tags) that references branch identifier 504, selected portions of scheduling data 506, and additionally, or alternatively, selected elements of aggregated customer profile data 368, aggregated customer account data 480, and/or aggregated customer reporting data 482 associated with appointment data element 326A. In some instances, executed template population module 510 may perform operations that parse template data 508, detect the occurrences of each placeholder data element within the template content, and based on the placeholder data elements, identify and obtain corresponding ones of branch identifier 504, selected portions of scheduling data 506, and the selected elements of aggregated customer profile data 368, aggregated customer account data 480, and/or aggregated customer reporting data 482 (e.g., as maintained in appointment data store 152). Executed template population module 510 may perform further operations that populate the document template, and output corresponding elements of populated template data, by replacing each of the placeholder data elements within template data 508 with corresponding ones of branch identifier 504, the selected portions of scheduling data 506, and additionally, or alternatively, the selected elements of aggregated customer profile data 368, aggregated customer account data 480, and/or aggregated customer reporting data 482 described herein.

Figure 5B:
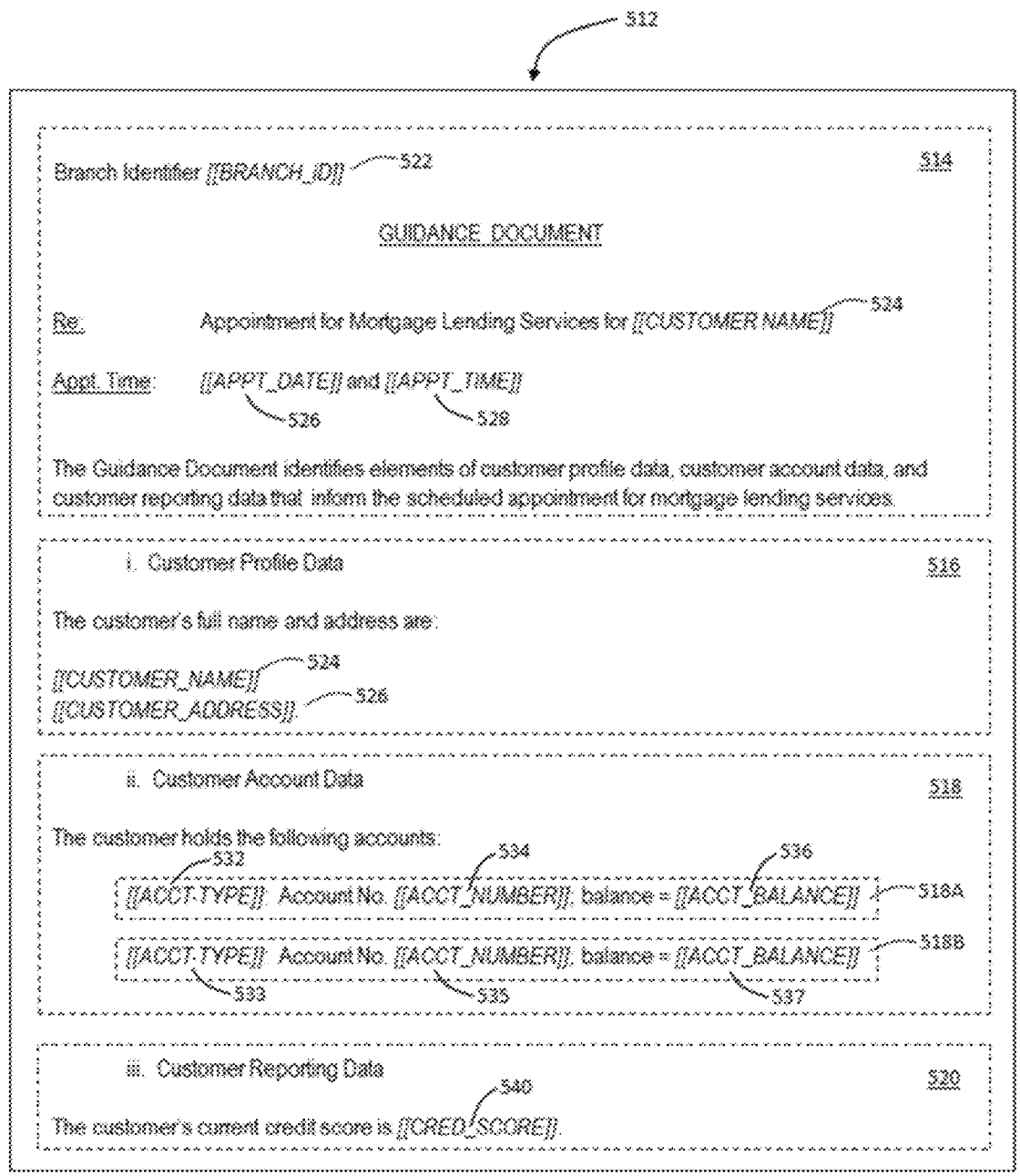
FIG. 5B is a diagram of an exemplary document template for an appointment guidance document, in accordance with some exemplary embodiments.

FIG. 5B is a schematic diagram illustrating an exemplary document template 512 consistent with, and appropriate to, selected customer appointment involving mortgage lending services and scheduled at the retail branch in Toronto, Canada, for 9:00 a.m. EDT on Apr. 30, 2020. In some instances, as described herein, template data 508 may identify and characterize document template 512, and executed template selection module 502 may perform any of the exemplary processes described herein to select template data 508, and as such, document template 512, based on portions of appointment data element 326A.

As illustrated in FIG. 5B, template data 508, which identifies and characterizes exemplary document template 512, may include introductory template content 514 that specifies the appointment type associated with document template 512 (e.g., mortgage lending services), that specifies the retail branch associated with the scheduled customer appointment, and further, that specifies the customer involved in the scheduled customer appointment and the time and date of the scheduled customer appointment. Further, template data 508 may also include: customer profile content 516, which includes digital content associated with the elements of customer profile data that characterize with the customer involved in the scheduled customer appointment; customer account content 518, which includes digital content associated with the elements of customer account data that identify and characterize financial services accounts held by the customer; and customer reporting content 52 0, which includes digital content associated with the elements of customer reporting data that characterize the interactions between the customer and one or more judicial, governmental, regulatory, or reporting agencies.

As further illustrated in FIG. 5B, each of introductory template content 514, customer profile content 516, customer account content 518, and customer reporting content 520 may include placeholder data (e.g., metadata pointers or tags) identifying discrete and corresponding elements of stored data characterizing the authorized purchase transaction, the customer, and/or the merchant. For example, introductory template content 514 may include placeholder data 522, which references the unique, alphanumeric identifier of the retail branch involved in the scheduled customer appointment (e.g., as assigned to the retail branch by the financial institution), placeholder data 524, which references a full name of the customer involved in the scheduled customer appointment, and placeholder data 526 and 528, which reference, respectively, the date and time of the scheduled appointment. Further, customer profile content 516 may also include placeholder data 524, as described herein, and placeholder data 530, which references the current mailing address of the customer involved in the scheduled customer appointment.

In some instances, customer account content 518 may include one or more elements of customer account content, which identify and characterize corresponding financial services accounts held by the customer involved in the scheduled customer account. As described herein, one or more of the financial services accounts may be issued to the customer by the financial institution associated with FI computing system 140, and additionally, or alternatively, by other financial institutions, and examples of these financial services accounts include, but are not limited to, a savings, checking, or other deposit account, a retirement account, a brokerage or investment account, a credit card account, a secured or unsecured line of credit, or a mortgage. For example, as illustrated in FIG. 5B, each of account content elements 518A and 518B may be associated with a corresponding one of the financial services accounts, and may include: (i) respective ones of placeholder data 532 and 533, which references an account type of the corresponding financial services account; (ii) respective ones of placeholder data 534 and 535, which references an account number (e.g., a tokenized account number) or other unique identifier of the corresponding financial services account; and (iii) respective ones of placeholder data 536 and 537, which references a current balance of the corresponding financial services account. Further, customer reporting content 520 may include placeholder data 540, which references a credit score associated with the customer involved in the scheduled customer appointment.

The disclosed embodiments are, however, not limited to these exemplary elements of introductory content and customer profile, account, and reporting content, and in other instances, document template 512 may include or identify any additional or alternate elements of digital content, and may include placeholder data identifying any additional or alternate elements of customer profile, account, or reporting data, that would information the provisioning of mortgage-lending services during the scheduled customer appointment. The disclosed embodiments are also not limited to a single set of account content elements, such as account content elements 518A and 518B, and in other instances, customer account content 518 may include any additional or alternate sets of account content elements. Further, although not illustrated in FIG. 5B, customer account data 518 may also include additional information (e.g., metadata, executable scripts, etc.) that, when processed by FI computing system 140, cause FI computing system 140 to perform any of the exemplary processes described herein to generate additional elements of customer account content for each financial services account held by the customer (e.g., as identified and characterized by elements of aggregated customer account data 480 associated with appointment data element 326A), and to populate the placeholder data within each additional elements of customer account content with corresponding portions of these elements of aggregated customer account data 480.

Referring back to FIG. 5A, executed template population module 510 may perform operations that parse template data 508, detect the occurrences of each element of placeholder data within the template data 508, and based on the placeholder data elements, access and load the corresponding elements of the stored appointment, customer profile, customer account, and/or customer reporting data associated with the scheduled customer appointment for mortgage-lending services (e.g., from appointment data store 152). Template population module 510 may perform further operations that populate template data 508, as such, the corresponding document template, by replacing each of the placeholder data elements within template data 508 with the corresponding elements of the stored appointment, customer profile, customer account, and/or customer reporting data.

For example, to populate placeholder data 522 with the unique alphanumeric identifier of the retail branch involved in the scheduled customer appointment, executed template population module 510 may access appointment data element 326A, parse appointment data element 326A to obtain branch identifier 504 (e.g., "CA123456"), and modify a portion of introductory template content 514 of template data 50 to replace placeholder data 522 with branch identifier 504. Further, executed template population module 510 may further parse appointment data element 326A to obtain scheduling data 506 and to extract an appointment date (e.g., "Apr. 30, 2020") and an appointment time (e.g., "9:00 a.m. EDT") of the scheduled customer appointment. In some instances, executed template population module 510 may modify additional portions of introductory template content 514 to replace placeholder data 526 with the extracted appointment time, and to replace placeholder data 528 with the extracted appointment data, e.g., to populate each of placeholder data 526 and 528 with respective ones of the extracted appointment time and appointment date of the scheduled customer appointment.

Further, and to populate placeholder data 524 with the full name of the customer involved in the scheduled customer appointment, and to populate placeholder data 526 with the current address of the customer, executed template population module 510 may access aggregated customer profile data 368 within appointment data store 152, and may identify one or more elements of customer profile data 344 associated with appointment data element 326A. In some instances, executed template population module 510 may parse customer profile data 344 to identify and extract a full name of the customer (e.g., "John Q. Stone") and a current address of the customer (e.g., "505 9$^{th}$ Street N.W., Washington, D.C., 20005), and may modify portions of introductory template content 514 and customer profile content 516 to replace placeholder data 524 with the extracted full name of the customer. Further, executed template population module 510 may also modify an additional portion of customer profile content 516 to replace placeholder data 530 with the extracted current address of the customer.

In some instances, to populate the placeholder data maintained within each of account data elements of customer account content 518 (e.g., account content elements 518A and 518B of FIG. 5B), executed template population module 510 may access aggregated customer account data 480 within appointment data store 152, and may identify one or more elements of customer account data 452 associated with appointment data element 326A. For example, the elements of customer account data 452 (e.g., as obtained from custodian system 132 by FI computing system 140 using any of the processes described herein) may identify and characterize financial services that include, but are not limited to, a checking account maintained by the customer at the financial institution associated with FI computing system 140 and a credit card account issued to the customer by the financial institution associated with FI computing system 140. The disclosed embodiments are, however, not limited to these exemplary financial services accounts, and in other examples, customer account data 452 may identify and characterize any additional, or alternate financial services account issued to the customer by, or held by the customer at, the financial institution associated with FI computing system 140 or any other financial institution or business entity associated with one of custodian systems 130.

By way of example, executed template population module 510 may perform operations that obtain, from customer account data 452, a first subset of account data elements that identify and characterize the checking account held by the customer, and a second subset of the account data elements that identify and characterize the credit card account issued to the customer. To populate the placeholder data maintained within account content elements 518A, executed template population module 510 may parse the first subset of the account data elements to identify and extract account type data that characterizes the checking account (e.g., "CHECKING"), a unique identifier of the checking account (e.g., a tokenized account number, such as "XXXXXX7809"), a current balance of the checking account (e.g., "$13,275.35"). Further, in some instances, executed template population module 510 may modify portions of account content elements 518A (e.g., as maintained within customer account content 518) to replace placeholder data 532 with the extracted account data type that characterizes the checking account, to replace placeholder data 534 with the tokenized account number of the checking account, and to replace placeholder data 536 with the current balance of the checking account.

Further, and to populate the placeholder data maintained within account content elements 518B, executed template population module 510 may parse the second subset of the account data elements to identify and extract account type data that characterizes the credit card account (e.g., "CREDIT CARD"), a unique identifier of the credit card account (e.g., a tokenized account number, such as "XXXX-XXXXXX-01234"), a current balance of the credit card account (e.g., "$6,682.34"). In some instances, executed template population module 510 may modify portions of account content elements 518B (e.g., as maintained within customer account content 518) to replace placeholder data 533 with the extracted account data type that characterizes the credit card account, to replace placeholder data 535 with the tokenized account number of the credit card account, and to replace placeholder data 537 with the current balance of the credit card account.

In additional examples, and to populate placeholder data 540 with a current credit score of the customer involved in the scheduled customer appointment, executed template population module 510 may access aggregated customer reporting data 482 within appointment data store 152, and identify one or more elements of customer reporting data 460 associated with appointment data element 326A. Executed template population module 510 may parse customer reporting data 482 to identify and extract the current credit score of the customer (e.g., "756"), and may modify a portion of customer reporting content 520 to replace placeholder data 540 with the extracted credit score of the customer.

Executed template population module 510 may also perform any of the exemplary processes described herein to populate any additional, or alternate, elements of placeholder data within introductory template content 514, customer profile content 516, customer account content 518, or other digital content within template data 508, e.g., based on corresponding portions of appointment data element 326A, customer profile data 344, customer account data 452, and customer reporting data 460. For example, executed template population module 510 may perform any of the exemplary processes described herein to populate placeholder data maintained within any additional, or alternate, set of account content elements within customer account content 518 with corresponding portions of customer account data 452, which identify and characterize additional, or alternate, financial services accounts held by the customer involved in the scheduled customer appointment.

Referring back to FIG. 5A, executed template population module 510 may generate populated template data 542 that includes the populated elements of digital content maintained within template data 508 (e.g., as populated with corresponding portions of appointment data element 326A, customer profile data 344, customer account data 452, and customer reporting data 460 using any of the exemplary processes described herein). As described herein, the populated elements of digital content may collectively represent a populated document template (e.g., a populated version of document template 512) for the scheduled customer appointment involving mortgage lending services. Further, executed template population module 510 may also perform operations that package, into populated template data 542, at least a portion of the formatting data maintained within template data 508, which establishes the visual characteristics and/or positions of the one or more populated elements of digital content within the corresponding guidance document. Executed template population module 510 may provide populated template data 542, and in some instances, branch identifier 504 and/or scheduling data 506, as inputs to a document generation module 544 executed by FI computing system 140.

Document generation module 544 may parse populated template data 542 to extract the populated elements of digital content and the corresponding formatting data, and may perform operations that generate a guidance document 546 that includes the populated elements of digital content and further, that is structured in accordance with the formatting data. As described herein, guidance document 546 may include customer profile, account, and/or reporting data that inform a provisioning of mortgage-lending services to the customer during the scheduled customer appointment, e.g., by the representative of the financial institution, and the format or structure of guidance document 546 may enable the representative of the financial institution to access and view guidance document 546 using a variety of computing devices or computing systems (e.g., desktop computers, laptop computers, tablet computers, smartphones, etc.). For example, document generation module 544 may generate guidance document 546 in accordance with an application- or hardware-independent format, such as portable document format (PDF). The disclosed embodiments are, however, not limited to PDF guidance documents, and in other examples, document generation module 544 may generate in any additional or alternate document format or structure consistent with the formatting data and appropriate to the computing devices or systems associated with the retail branch involved in the customer appointment, e.g., branch system 112.

FIG. 5C is a schematic diagram a schematic diagram illustrating exemplary guidance document 546. For example, as illustrated in FIG. 5C, guidance document 546 includes introductory template content 514 populated with the branch identifier of the retail branch involved in the scheduled customer appointment (e.g., "CA123456"), the date and time of the scheduled customer appointment (e.g., "Apr. 30, 2020" at "9:00 a.m. EDT"), and the full name of the customer involved in the customer appointment (e.g., "John Q. Stone"). Further, guidance document 546 may also include customer profile content 516 populated with the full name of the customer (e.g., "John Q. Stone") and the current address of the customer (e.g., "505 $9^{th}$ Street N.W., Washington, D.C., 20005). Further, and as illustrated in FIG. 5C, guidance document 546 may include account content elements 518A and 518B populated with the account types, tokenized account numbers, and account balances of corresponding ones of the checking account (e.g., populated account content elements 518A) and the credit card account (e.g., populated account content elements 518B) held by or issued to the customer involved in the scheduled customer appointment. Guidance document 546 may also include customer reporting content 520 populated with the current credit score of the customer (e.g., "756").

Referring back to FIG. 5A, document generation module 544 may perform operations that store guidance document 546, which informs the informs the customer appointment involving mortgage lending services and scheduled at the retail branch of the financial in Toronto, Canada, for 9:00 a.m. EST on Apr. 30, 2020, within a portion of a document data store 547 (e.g., as maintained within data repository 146). In some instances, document generation module 544 may also store branch identifier 504 and additionally, or alternatively, scheduling data 506, within the portion of document data store 547 in association with, or in conjunction with guidance document 546, e.g., to facilitate a provisioning of guidance document 546 to a computing system or device associated with the retail branch involved in the scheduled customer appointment, such as branch system 112.

Further, although not illustrated in FIG. 5A, executed template selection module 502 and template population module 510 may perform any of the exemplary processes described herein to generate additional elements of populated template data for each additional or alternate element of prioritized and queued appointment data maintained within appointment queue 226. In some examples, and based on the additional elements of populated template data, executed document generation module 544 may perform any of the exemplary processes described herein to generate guidance documents that inform the scheduled customer appointments associated with corresponding ones of the additional or alternate elements of prioritized and queued appointment data maintained within appointment queue 226, and to store each of the generated guidance documents within a portion of document data store 547, along with at least one of a corresponding branch identifier (e.g., a unique alphanumeric identifier assigned to a corresponding retail branch by the financial institution) or scheduling data associated with the corresponding scheduled customer appointment (e.g., a corresponding appointment date and/or time).

For example, and as described herein, appointment data element 326B of appointment data queue 226 may be associated with a customer appointment involving investment planning and scheduled for 10:00 a.m. EDT on Apr. 30, 2020, at a retail branch of the financial institution located in Mississauga, Canada, and appointment data element 326N may be associated with a customer appointment involving retirement planning services and scheduled for 10:00 a.m. EDT on Apr. 30, 2020, at a retail branch of the financial institution located in New York, N.Y. In some instances, and using any of the exemplary processes described herein, executed template selection module 502 may extract, from template data store 154, elements of template data that characterize document templates associated with the scheduled customer appointment involving investment planning (e.g., as characterized by appointment data element 326B) and associated with the scheduled customer appointment involving retirement planning (e.g., as characterized by appointment data element 326N).

Further, executed template population module 510 may perform any of the exemplary processes that modify portions of digital content included within each of the elements of template data by replacing elements of placeholder data with corresponding portions of appointment data elements 326B or 326N, and with corresponding portions of aggregated customer profile data 368, aggregated customer account data 480, and/or aggregated customer reporting data 482 associated with respective ones of appointment data elements 326B or 326N. In some instances, executed template population module 510 may generate elements of populated template data associated with each of appointment data elements 326B and 326N, and may provide the generated elements of populated template data as inputs to executed document generation module 544, which may perform any of the exemplary processes described herein to generate guidance document 548, which informs the scheduled customer appointment involving the investment-planning services (e.g., as characterized by appointment data element 326B), and to generate guidance document 554, which informs the scheduled customer appointment involving the retirement-planning services (e.g., as characterized by appointment data element 326N).

As described herein, executed document generation module 544 may also perform operations that store guidance document 548, which informs the customer appointment involving investment planning and scheduled for 10:00 a.m.

EDT on Apr. 30, 2020, at the retail branch of the financial institution located in Mississauga, Canada, within a portion of document data store 547 along with at least one of a branch identifier 550 (e.g., a unique alphanumeric identifier assigned by the financial institution to the retail branch in Mississauga, Canada) or scheduling data 552 (e.g., that identifies the appointment date of Apr. 30, 2020, and/or the appointment time of 10:00 a.m. EDT). Further, and by way of example, executed document generation module 544 may perform any of the exemplary processes described herein to store guidance document 554, which informs the customer appointment involving retirement-planning services and scheduled for 10:00 a.m. EDT on Apr. 30, 2020, at the retail branch of the financial institution located in New York, N.Y., within an additional portion of document data store 547, along with at least one of a branch identifier 556 (e.g., a unique alphanumeric identifier assigned by the financial institution to the retail branch in New York, N.Y.) or scheduling data 558 (e.g., that identifies the appointment date of Apr. 30, 2020, and/or the appointment time of 10:00 a.m. EDT).

Figure 5D:
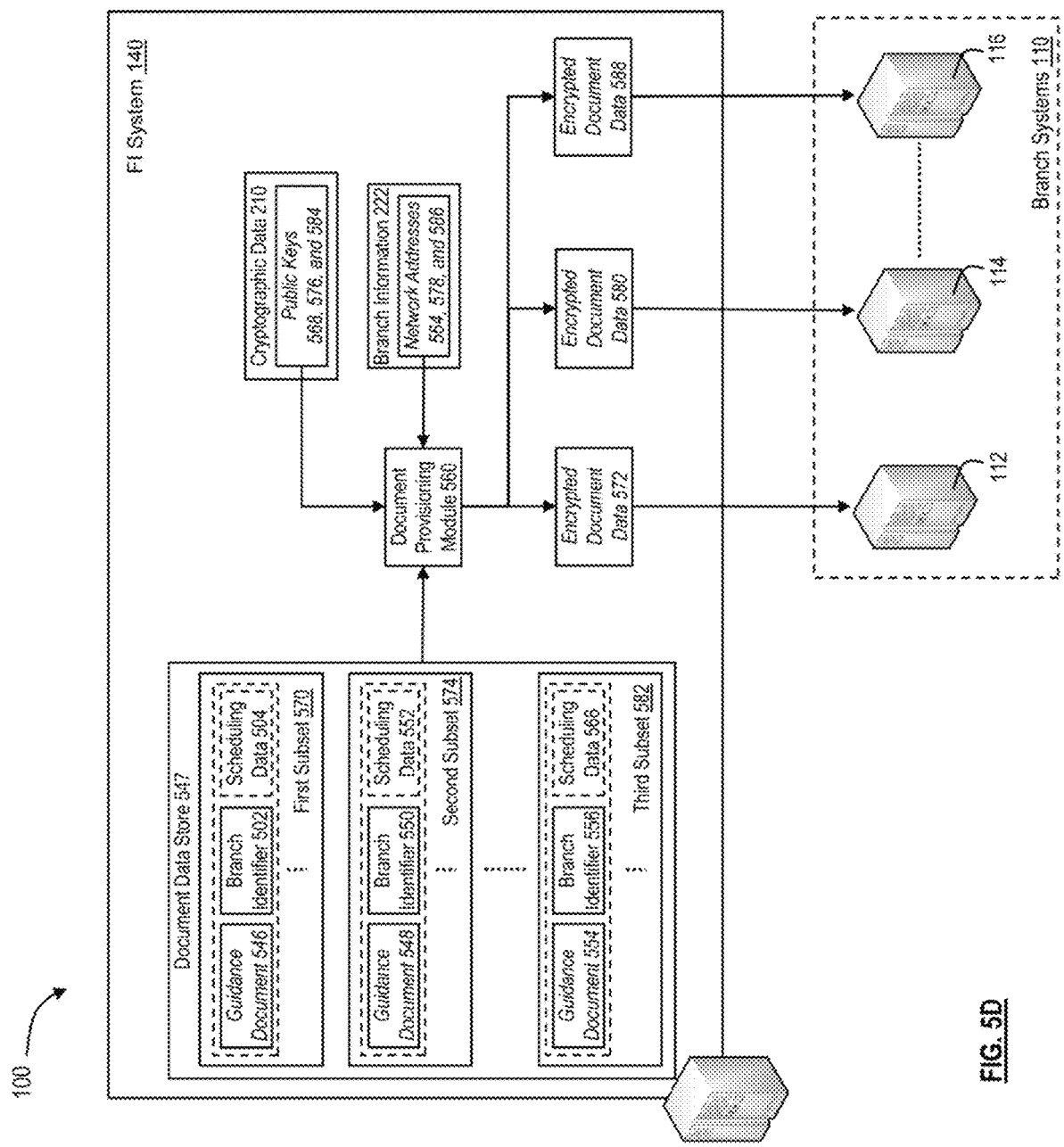
FIG. 5D is a block diagram illustrating a portion of an exemplary computing environment, in accordance with some exemplary embodiments.

In some instances, as illustrated in FIG. 5D, a document provisioning module 560 executed by FI computing system 140 may access document data store 547, and perform any of the exemplary processes described herein to encrypt and provision each of the generated guidance documents (e.g., guidance documents 544, 548, and 554) to a corresponding one of branch systems 110 disposed at the retail branch associated with the corresponding scheduled customer appointment. For example, document provisioning module 560 may access document data store 547, and may perform operations that extract guidance document 546, which corresponds to the customer appointment involving mortgage lending services and scheduled at the retail branch of the financial in Toronto, Canada, for 9:00 a.m. EST on Apr. 30, 2020, and branch identifier 504, which includes the unique alphanumeric identifier assigned to the retail branch in Toronto, Canada, by the financial institution.

Further, and based on branch identifier 504, document provisioning module 560 may perform operations that: (i) obtain, from branch information 222 (e.g., as maintained within data repository 146), information that identifies the corresponding one of branch systems 110 associated with, and disposed within the retail branch in Toronto, Canada, such as a network address 564 of branch system 112; and (ii) obtain, from cryptographic data 210 (e.g., as maintained within data repository 146), a public cryptographic key 568 associated with branch system 112. In some instances, document provisioning module 560 may perform operations that encrypt guidance document 546 using public cryptographic key 568, and that cause FI computing system 140 to transmit the encrypted guidance document across network 120 to branch system 112 (e.g., associated with or disposed at the retail branch in Toronto, Canada) for decryption and presentation to a representative of the financial institution in advance of, or during, the scheduled customer appointment. Document provisioning module 560 may also perform any of these exemplary processes to encrypt and provision each additional, or alternate, guidance document within document data store 547 (e.g., guidance documents 548 and 554, etc.) to a corresponding one of branch systems 110 on a document-by-document basis.

In some examples, although the document-by-document provisioning of the encrypted guidance documents to corresponding ones of branch systems 110 may provide representatives of the financial institution with confidential customer information informing each of the scheduled customer appointments, the processing of guidance documents maintained within document data store 547, and the extraction of corresponding system identifiers and cryptographic keys, on a document-by-document basis may represent an inefficient use of computational resources by FI computing systems 140, especially in view of the significant number of guidance documents that require provisioning to the retail branches of the financial institution on a daily basis. Further, the repeated transmission of encrypted guidance documents from FI computing system 140 to each of branch systems 110 may provide malicious third parties with increased opportunities to intercept the encrypted guidance documents (and potentially exploit confidential customer information) and attack FI computing system 140 or one or more of branch systems 110 (e.g., through a man-in-the-middle attack that alters the intercepted transmissions, etc.).

In other examples, document provisioning module 560 may perform any of the exemplary processes described herein to sort the guidance documents maintained within document data store 547 in accordance with the respective branch identifiers, to package the sorted guidance documents into corresponding, branch-system specific document files, which document provisioning module 560 may encrypt using public cryptographic keys associated with corresponding ones of branch systems 110. Further, and as described herein, document provisioning module 560 may perform operations that transmit each of the encrypted, branch-system-specific document files to a corresponding one of branch systems 110, e.g., decryption and presentation to a representative of the financial institution in advance of, or during, the scheduled customer appointment. Certain of these exemplary processes, which provision a single, encrypted file of guidance documents to each of branch systems 110 prior to the future temporal interface, may be implemented by FI computing system 140 in addition to, or as an alternate to, processes that provision encrypted guidance documents to branch systems 110 on a document-by-document basis, and may reduce an exposure of raw elements of confidential customer data during transmission to the computing systems of the retail branches, and such, may reduce, or eliminate, opportunities for breach or attack by malicious third parties during provisioning of the encrypted guidance documents to the branch systems 110.

Referring back to FIG. 5D, document provisioning module 560 may perform operations that access branch information 222, and extract the unique alphanumeric identifiers associated with the retail branches of the financial institution and as such, associated with each of branch systems 110. For example, and as described herein, branch systems 110 may include branch system 112, which may be associated with or disposed at the retail branch located in Toronto, Canada, branch system 114, which may be associated with or disposed the retail branch of the financial institution in Mississauga, Canada, and branch system 116, which may be associated with or disposed within the retail branch in New York, N.Y. As illustrated in FIG. 5D, document provisioning module 560 may perform operations that obtain, from branch information 222, branch identifier 504 associated with branch system 112 and the retail branch located in Toronto, Canada, branch identifier 550 associated with branch system 114 and the retail branch located in Mississauga, Canada, and branch identifier 556 associated with branch system 116 and the retail branch located in New York, N.Y.

In some instances, document provisioning module 560 may access document data store 547, and perform operations that identify subsets of the guidance documents associated with each of branch identifiers 504, 550, and 556 (and with any additional, or alternate, branch identifiers maintained within branch information 222). For example, document provisioning module 560 may identify a first subset 570 of guidance documents (e.g., including guidance document 546) that are each associated with branch identifier 504 and as such, with branch system 112 associated with or disposed within the retail branch located in Toronto, Canada. Further, and as described herein, document provisioning module 560 may also perform operations that obtain public cryptographic key 568 associated with branch system 112 from cryptographic data 210 and network address 564 of branch system 112 from branch information 222. Document provisioning module 560 may perform operations that encrypt first guidance-document subset 570 using public cryptographic key 568, and that package encrypted first guidance-document subset 570 into corresponding portions of encrypted document data 572, which FI computing system 140 may transmit across network 120 to network address 564 of branch system 112.

Further, and by way of example, document provisioning module 560 may also identify a second subset 574 of guidance documents within document data store 547 (including guidance document 548) that are each associated with branch identifier 550 and as such, with branch system 114 disposed within the retail branch located in Mississauga, Canada. Document provisioning module 560 may perform operations that obtain a public cryptographic key 576 associated with branch system 114 from cryptographic data 210, and that obtain a network address 578 of branch system 114 from branch information 222. In some instances, document provisioning module 560 may also perform operations that encrypt second guidance-document subset 574 using public cryptographic key 576, and that package encrypted second guidance-document subset 574 into corresponding portions of an encrypted document data 580, which FI computing system 140 may transmit across network 120 to network address 578 of branch system 114.

In additional examples, document provisioning module 560 may identify a third subset 582 of guidance documents within document data store 547 (including guidance document 554) that are each associated with branch identifier 556 and as such, with branch system 116 disposed within the retail branch located in New York, N.Y. Document provisioning module 560 may perform operations that obtain a public cryptographic key 584 associated with branch system 116 from cryptographic data 210, and that obtain a network address 586 of branch system 116 from branch information 222. In some instances, document provisioning module 560 may also perform operations that encrypt third guidance-document subset 582 using public cryptographic key 584, and that package encrypted third guidance-document subset 582 into corresponding portions of an encrypted document data 588, which FI computing system 140 may transmit across network 120 to network address 586 of branch system 116. Further, although not illustrated in FIG. 5D, document provisioning module 560 may perform any of the exemplary processes described herein to generate additional encrypted document files that include encrypted subsets of guidance documents associated with each additional, or alternate, retail branch of the financial institution and corresponding branch system (e.g., one of branch systems 110), and to transmit each of the additional encrypted document files across network 120 to a network address of a corresponding one of branch systems 110.

Each of branch systems 112, 114, and 116 may receive corresponding ones of encrypted document data 572, 580, and 588, e.g., through corresponding programmatic interfaces, such as application programmatic interfaces (APIs). In some instances, not illustrated in FIG. 5D, one or more application programs executed by each of branch systems 112, 114, and 116 may perform operations that decrypt corresponding ones of encrypted document data 572, 580, and 588 using an appropriate private cryptographic key (e.g., as maintained within respective ones of locally accessible, tangible, non-transitory memories). Further, upon decryption using respective public cryptographic keys, each of branch systems 112, 114, and 116 may store a corresponding one of first subset 570, second subset 574, and third subset 582 of guidance documents within the locally accessible memory, and the one or more application programs executed by branch systems 112, 114, and 116 may present the guidance documents within respective ones of first subset 570, second subset 574, and third subset 582 within a corresponding digital interface, e.g., for review by a representative of the financial institution during, or prior to, corresponding ones of the scheduled customer appointments.

Figure 6:
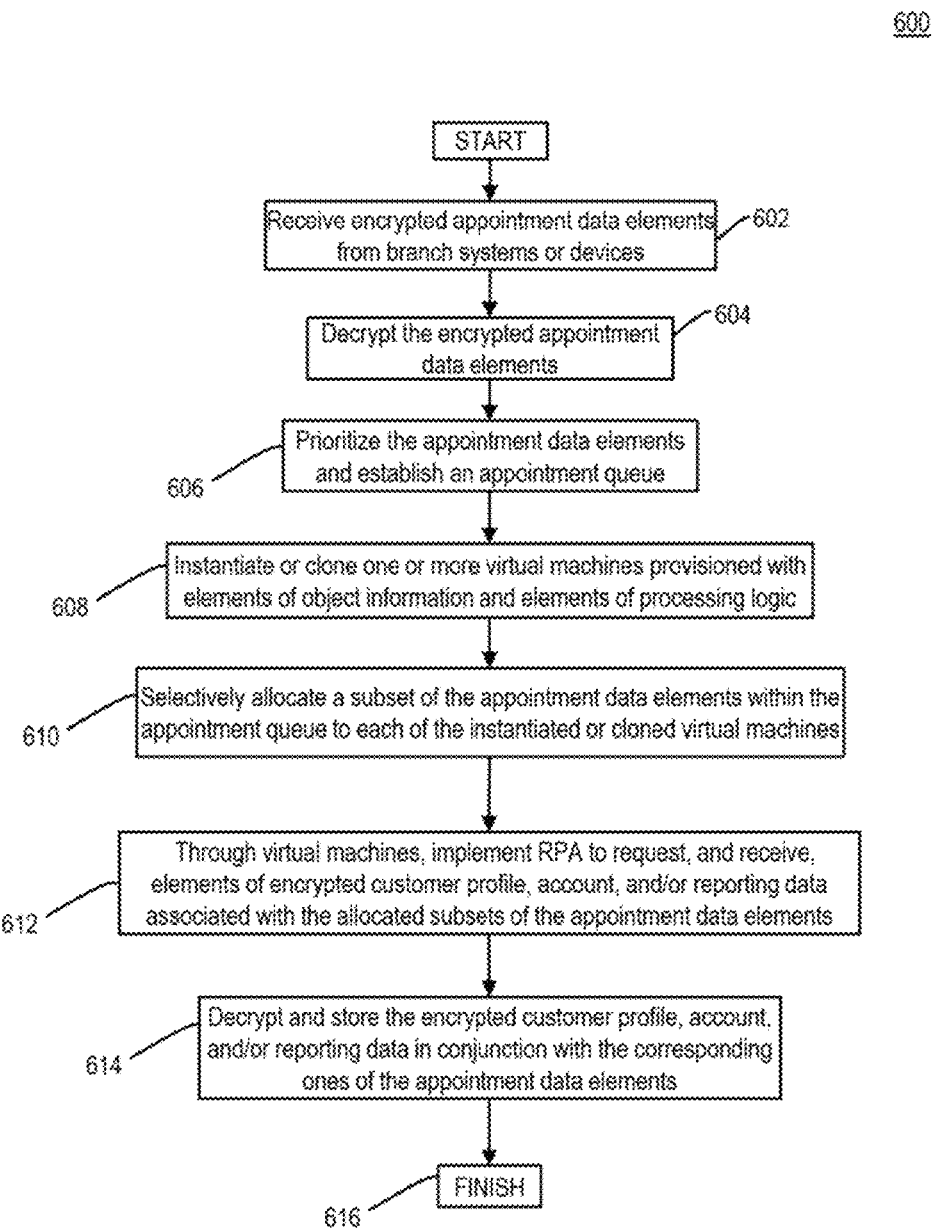
FIG. 6 is a flowchart of an exemplary process for managing queued appointment workflow using robotic process automation, in accordance with some exemplary embodiments.

FIG. 6 is a flowchart of an exemplary process 600 for managing queued appointment workflow using robotic process automation, in accordance with disclosed exemplary embodiments. For example, a network-connected computing system operating within environment 100, such as FI computing system 140, may perform one or more of the steps of exemplary process 600, which, among other things, include establishing a prioritized queue of appointment data elements associated with customer appointments scheduled during a future temporal interval, instantiating one or more virtual machines and provisioning the one of more virtual machines with corresponding elements of object and action data and elements of processing logic, and through an execution of one or more programmatic software robots ("bots") by these virtual machines, implemented any of the exemplary robotic process automation (RPA) techniques to request and receive confidential customer information associated with, and informing, each of the scheduled customer appointments.

For example, referring to FIG. 6, FI computing system 140 may receive encrypted elements of appointment data from computing systems or devices associated with, or disposed within, one or more retail branches of a financial institution (e.g., in step 602). In some instances, each of the encrypted appointment data elements may identify and characterize a customer appointment scheduled at a corresponding of the retail branches during a future temporal interval, e.g., Apr. 30, 2020. As described herein, each of the branch computing systems or devices may encrypt locally maintained appointment data elements using a public cryptographic key associated with FI computing system 140, which FI computing system 140 may distribute or broadcast across network 120 to each of the branch computing systems or devices, and FI computing system 140 may perform any of the exemplary processes described herein to decrypt each of the encrypted appointment data elements using a corresponding private cryptographic key (e.g., in step 604).

For example, each of the now-decrypted appointment data elements may be associated with a customer appointment scheduled at a retail branch of the financial institution during the future temporal period. In some instances, and as described herein, each of the appointment data elements may include an alphanumeric branch identifier that identifies the corresponding retail branch, and scheduling data that identifies a local time, date, and geographic location of the scheduled customer appointment. Further, each of the appointment data elements may also include, but is not limited to, customer data that identifies the customer involved in the scheduled customer appointment (e.g., a full name of the customer, one or more authentication credentials of the customer at the financial institution, etc.), and data identifying an appointment type associated with the scheduled customer appointment (e.g., mortgage-lending services, investment planning services, retirement-planning services, tax-planning services, etc.).

In some instances, FI computing system 140 may perform any of the exemplary processes described herein to prioritize the appointment data elements that identify and characterize the customer appointment scheduled during the future temporal interval, and to establish, within one or more tangible, non-transitory memories, and appointment queue that includes the prioritized appointment data elements (e.g., in step 606). For example, and as described herein, FI computing system 140 may perform, in step 604, operations that parse the scheduling data within each appointment data elements to determine a local appointment time and local time zone (e.g., Eastern Daylight Time (EDT), etc.) associated with each of the scheduled customer appointments, that convert that local appointment time (e.g., in the local time zone) into a reference appointment time in accordance with a temporal reference (e.g., Coordinated Universal Time (UCT), etc.), and that prioritize the appointment data elements within the appointment queue based on the corresponding reference appointment time, e.g., from earliest to latest within the future temporal interval. In additional, or alternate, examples, as described herein, FI computing system 140 may also perform operations in step 606 that prioritize all, or a selected subset, of the appointment data elements based on prioritization factors that include, but are not limited to, the corresponding appointment type, the corresponding customer, and/or the corresponding geographic location of the scheduled appointment.

FI computing system 140 may also perform any of the exemplary processes described herein to instantiate one or more virtual machines provisioned with elements of object information and elements of processing logic, and additionally, or alternatively, to clone one or more previously instantiated and provisioned virtual machines (e.g., in step 608). As described herein, each of the provisioned elements of the object information may include an application model and action data, and when processed by the instantiated or cloned virtual machines, the provisioned elements of object information may enable each of the instantiated or cloned virtual machines to generate one or more executable objects based on corresponding ones of the application models and action data, and to establish one or more programmatic software robots (e.g., "bot"), each which includes a corresponding one of the generated executable objects.

By way of example, each of the application models may expose a corresponding one of the executable objects, and as such, one or more of the programmatic bots that include the corresponding executable object, to an application program executed by a computing system within environment 100 (e.g., one of custodian systems 130 that maintain the elements of confidential customer profile, account, or reporting data described herein) and further, may identify and characterize interface elements displayed within one or more display screens of a graphical user interface (GUI) or digital portal generated and presented by a front-end component of that executed application. Additionally, and as described herein, the action data associated with each of the application models may those discrete or sequential actions that the corresponding executable object, and the one or more programmatic bots that include the corresponding executable object, may perform during interaction with the GUI or the digital portal generated and presented by the executed application program and in accordance with the application model and the elements of processing logic.

Referring back to FIG. 6, FI computing system 140 may perform any of the exemplary processes described herein to selectively allocate, to each of the instantiated or cloned virtual machines, a subset of the appointment data elements maintained within the appointment queue (e.g., in step 610). Further, and upon execution by FI computing system 140, the one or more programmatic bots established by each of the instantiated or cloned virtual machines may implement any of the exemplary RPA-based techniques described herein (e.g., in accordance with the provisioned elements of processing logic) to request, and receive, elements of confidential customer profile, account, and/or reporting data that inform the scheduled customer appointments associated with the allocated subsets of the appointment data elements (e.g., in step 612). For example, and as described herein, the elements of processing logic provisioned to each of the virtual machines may encode sequential operations that, when performed by the one or more programmatic bots established by each of the virtual machines, cause respective ones of the executable objects to access the GUI or digital portal generated and presented by the application program executed at a corresponding one of custodian systems 130, and to request and receive, via the accessed GUIs or digital portals, one or more encrypted elements of confidential customer data associated with each of the appointment data elements within the corresponding allocated subset. The confidential customer data may, for example, include any of the exemplary elements of customer profile, accounting, or reporting data described herein, and in some instances, each of the encrypted elements of confidential customer data obtained in step 612 may be associated with a corresponding one of the appointment data elements maintained within the appointment queue.

In some instances, FI computing system 140 may decrypted each of the received elements of encrypted confidential customer data, such as the exemplary elements of customer profile, account, and/or reporting data described herein, using the private cryptographic key associated with FI system 140 (e.g., in step 614). Further, and through any of the exemplary processes described herein, FI computing system 140 may associate each of the received elements of confidential customer data (e.g., the elements of customer profile, account, and/or reporting data described herein) with a corresponding appointment data element maintained within the appointment queue, and store each of the received elements of confidential customer data within a data repository in association and conjunction with the corresponding appointment data element (e.g., in step 614). As described herein, the stored elements of confidential customer data (e.g., the stored elements of customer profile, account, and/or reporting data) may inform the provisioning of financial services during the scheduled customer appointments associated with corresponding ones of the appointment data elements maintained within the appointment queue, and in some instances, exemplary process 600 may be completed in step 616.

Figure 7:
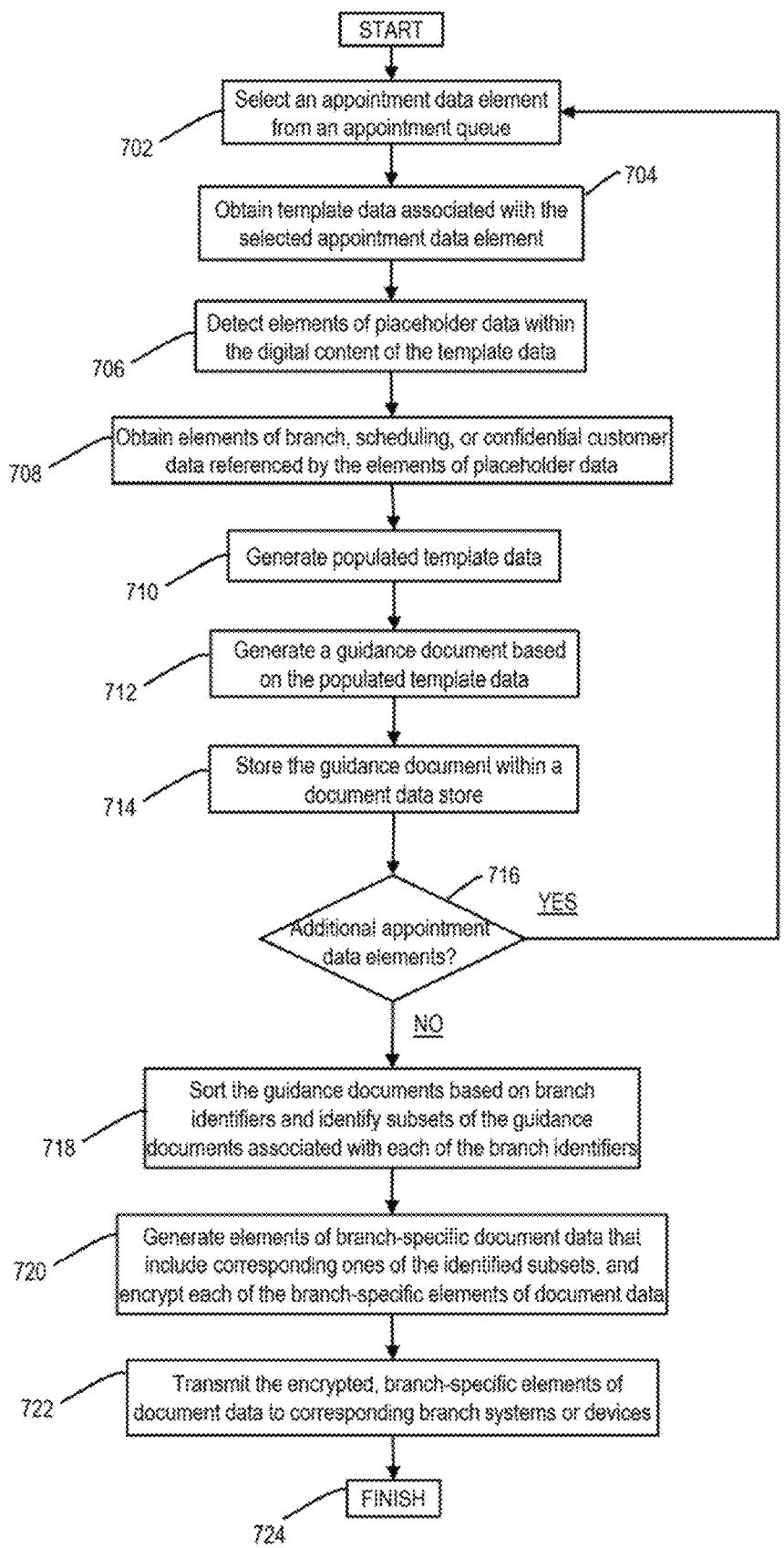
FIG. 7 is a flowchart of an exemplary process for generating template-based guidance documents characterizing queued appointment data, in accordance with some exemplary embodiments.

FIG. 7 is a flowchart of an exemplary process 700 for generating template-based guidance documents characterizing queued appointment data, in accordance with disclosed exemplary embodiments. For example, a network-connected computing system operating within environment 100, such as FI computing system 140, may perform one or more of the steps of exemplary process 700, which, among other things, include identifying an appointment-specific document template associated with, and appropriate to, each of the appointment data elements maintained within an appointment queue, and that populate each of the appointment-specific document templates with selected elements of customer profile data, customer account data, customer reporting data, or other confidential data, and that generate and transmit, to each of the branch systems 110, encrypted document data that includes encrypted guidance documents informing each of the customer appointments scheduled at the corresponding retail branch during a future temporal interval.

Referring to FIG. 7, FI computing system 140 may access an appointment queue, which include one or more prioritized elements of appointment data, and may perform any of the exemplary processes described herein to select one of the prioritized and queued elements of appointment data for processing (e.g., in step 702). As described herein, the selected appointment data element may be associated with a customer appointment scheduled at a corresponding retail branch of the financial institution during the future temporal interval, and may include, but is not limited to, a branch identifier that uniquely identifies the retail branch involved in the scheduled customer appointment (e.g., a unique alphanumeric identifier assigned to the retail location by the financial institution, etc.), scheduling data that specifies the time, date, and/or geographic location of the scheduled customer appointment, customer information that uniquely identifies the customer involved in the scheduled customer appointment, and appointment type data that identifies the appointment type associated with the scheduled customer appointment.

FI computing system 140 may also perform any of the exemplary processes described herein to obtain, from a template data store, one or more elements of template data associated with the selected appointment data element (e.g., in step 704). For example, the one or more elements of template data may identify and characterize a document template that, when processed by FI computing system 140, facilitate a generation of a guidance document that informs the provisioning of financial services during the customer appointment associated with the selected appointment data element. In some instances, and as described herein, the one or more elements of template data may be specific to, or associated with, the appointment type characterizing the scheduled customer appointment associated with the selected appointment data element, although in additional, or alternate, instances, the one or more elements of template data may be associated with, or specific to, the particular type of customer appointment, the particular customer, the particular retail branch, the particular appointment location, or any additional, or alternate, appointment characteristic appropriate to the selected appointment data element.

Further, and as described herein, the one or more elements of template data may include elements of digital content for inclusion in the corresponding guidance document (e.g., elements of textual content, graphical content, etc.) and formatting data that establishes visual characteristics (e.g., a font size of the textual content) and/or positions of the one or more elements of digital content within the corresponding guidance document. The one or more elements of template data may also include, at corresponding positions within the digital content, placeholder data (e.g., metadata pointers or tags) that references the branch identifier, the selected portions of the scheduling data, and additionally, or alternatively, selected elements of confidential customer data associated with the selected appointment data elements, such as the aggregated customer profile data, aggregated customer account data, and/or aggregated customer reporting data described herein.

In some instances, FI computing system 140 may perform any of the exemplary processes described herein to parse the one or more elements of template data to detect an occurrence of each element of the placeholder data within the digital content (e.g., in step 706), and to identify and obtain one or more of the branch identifier, the portions of the scheduling data, and/or the elements of confidential customer data that are referenced by the respective ones of the placeholder data elements and that are associated with the selected appointment data element (e.g., in step 708). Further, FI computing system 140 may also perform any of the exemplary processes described herein to populate the document template characterized by the one or more elements of template data, and to generate populated template data, by replacing each of placeholder data elements within the elements of template data with corresponding ones of the branch identifier, the selected portions of the scheduling data, and/or the selected elements of confidential customer data (e.g., in step 710).

The populated template data may, for example, include populated elements of digital content maintained within the one or more elements of template data 508 (e.g., as populated with corresponding ones of the branch identifier, the selected portions of the scheduling data, and/or the selected elements of confidential customer data, which may represent a populated document template for the customer appointment associated with the selected appointment data element. Further, in step 710, FI computing system 140 may also perform operations that package, into the populated template data, at least a portion of the formatting data maintained within the one or more elements of the template data, which establishes the visual characteristics and/or positions of the one or more populated elements of digital content within the corresponding guidance document.

In some instances, FI computing system 140 may perform any of the exemplary processes described herein to parse the populated template data and generate a guidance document that includes the populated elements of digital content and further, that is structured in accordance with the formatting data (e.g., in step 712). As described herein, the guidance document may include elements of confidential customer data (e.g., the customer profile, account, or reporting data described herein) that inform the provisioning of financial services to the customer during the scheduled customer appointment, and the format or structure of the guidance document may enable the representative of the financial institution to access and view the generated guidance document using a variety of computing devices or computing systems (e.g., desktop computers, laptop computers, tablet computers, smartphones, etc.). For example, and as described herein, FI computing system 140 may generate the guidance document in accordance with an application- or hardware-independent format, such as portable document format (PDF).

In step 714, FI computing system 140 may perform operations that store the guidance document within a portion of a document data store (e.g., document data store 547 of FIGS. 5A and 5D), along with the branch identifier and additionally, or alternatively, a portion of the scheduling data maintained within the selected appointment data element. Further, FI computing system 140 may access the appointment queue, and determine whether the document data store include a guidance document associated with each of the appointment data elements maintained within the appointment queue and as such, whether the appointment queue includes additional appointment elements awaiting processing and document generation through the exemplary processes described herein (e.g., in step 716). If, for example, FI computing system 140 were to determine that the appointment queue includes one or more appointment data elements awaiting processing and document generation (e.g., step 716; YES), exemplary process 700 may pass back to step 702, and FI computing system 140 may perform any of the exemplary processes described herein to select an additional one of the appointment data elements for processing.

In other examples, if FI computing system 140 were to establish that document data store includes a guidance document associated with each of the appointment data elements maintained within the appointment queue, and as such, that no additional appointment data elements await processing and document generation (e.g., step 716; NO), FI computing system 140 may perform any of the exemplary processes described herein to sort the guidance documents maintained within document data store in accordance with their respective branch identifiers, and to identify subsets of the guidance documents that are associated with each of the branch identifiers and as such, that inform customer appointments scheduled at each of the retail branches during the future temporal interval (e.g., in step 718). In some instances, FI computing system 140 may perform any of the exemplary processes described herein to package each of the identified subsets of guidance documents into a corresponding elements of branch-specific document data, and encrypt each of the elements of branch-specific document data, and the corresponding subset of guidance documents, using a corresponding, branch-specific public cryptographic key (e.g., in step 720). For example, each of the branch-specific public cryptographic keys may be associated with, assigned to, or generated by a branch computing system or device disposed at the corresponding retail branch, such as a corresponding one of branch systems 110.

FI computing system may also obtain a network address of the computing system or device associated with each of the retail branches of the financial institution (e.g., an IP address, a MAC address, etc.), and may transmit each of element of the encrypted, branch-specific document data to the network address of the corresponding branch computing system or device (e.g., in step 722). Exemplary process 700 is then complete in step 724.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, appointment queueing engine 158, RPA management engine 160, APIs 208 and 350, decryption module 208, prioritization module 220, virtual machine 302, bots 314, 436, and 440, objects 312, 434, and 438, application programs 316, 406, and 414, front ends 320, 408, and 416, GUIs 318, 410, and 418, back ends 340, 412, and 420, templates election module 502, template population module 510, document generation module 544, and document provisioning module 560, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
  a memory storing instructions;
  a communications interface; and
  at least one processor coupled to the communications interface and the memory, the at least one processor being configured to execute the instructions to:
    obtain an element of appointment data associated with an appointment, the element of appointment data comprising a customer identifier;
    perform operations that instantiate a virtual machine, that provision the instantiated virtual machine with object information characterizing an interface element of a graphical interface of an application program executed by a first computing system, and that execute at least one software robot on the virtual machine in accordance with elements of processing logic specifying an interaction between the at least one software robot and the graphical interface of the application program executed by the first computing system, the object information comprising a type of the interface element and at least a structure or format of the input data, and the at least one software robot executed on the virtual machine performing operations that:
  (i) access programmatically, via the communications interface, the graphical interface of the application program executed by the first computing system;
  (ii) generate input data for the interface element based on the object information, and provision the input data to the interface element of the graphical interface accessed programmatically via the communications interface, the input data having a structure or format consistent with the object information; and
  (iii) based on the input data, request, via the communications interface through the graphical interface accessed programmatically, first data associated with the customer identifier;
receive the first data from the first computing system via the communications interface;
obtain, from the memory, template data comprising at least one element of digital content, a first element of placeholder data that references a portion of the first data, and formatting data;
replace the first element of placeholder data with the portion of the first data;
generate populated template data that includes the at least one element of digital content and the portion the first data, and generate a guidance document that includes the populated template data in accordance with the formatting data; and
perform operations that encrypt a data file comprising the guidance document using a public cryptographic key associated with a second computing system, and transmit, via the communications interface, the encrypted data file to the second computing system associated with the appointment.

2. The apparatus of claim 1, wherein:
the appointment data element comprises an appointment type associated with the appointment; and
the at least one processor is further configured to obtain the template data from the memory based on at least the appointment type.

3. The apparatus of claim 1, wherein:
the at least one processor is further configured to:
  via the communications interface, perform operations that (i) access a graphical interface of an application program executed by at least one second computing system, and (ii) request, through the accessed graphical interface, second data associated with the customer identifier;
  receive the second data from the at least one second computing system via the communications interface; and
the template data further comprises second elements of placeholder data, each of the second elements of placeholder data identifying a corresponding portion of the second data.

4. The apparatus of claim 3, wherein the at least one processor is further configured to:
replace each of the second elements of placeholder data with the corresponding portion of the second data;
generate additional populated template data that includes the at least one element of digital content, the portion of the first data, and the corresponding portions of the second data; and
generate the guidance document based on the additional populated template data.

5. The apparatus of claim 1, wherein the first data comprises at least one of profile, account, or reporting data associated with the customer identifier.

6. The apparatus of claim 1, wherein the at least one processor is further configured to:
obtain one or more additional elements of appointment data, each of the additional elements of appointment data being associated with an additional appointment and comprising an additional customer identifier, and at least one of additional elements of appointment data comprising information generated during a programmatic chatbot session;
via the communications interface, perform operations that, for each of the additional elements of appointment data: access the graphical interface of the executed application program; request, through the accessed graphical interface, second data associated with the each of the additional customer identifiers; and receive the requested second data from the first computing system; and
generate additional guidance documents for each of the additional appointment data elements based on the second data, and store the additional guidance documents within the memory.

7. The apparatus of claim 6, wherein the at least one processor is further configured to:
identify a subset of the additional guidance documents that are associated with the second computing system, and extract the identified subset of the additional guidance documents from the memory;
generate the data file that includes the guidance document and the identified subset of the additional guidance documents, and encrypt the data file using the public cryptographic key of the second computing system; and
transmit the encrypted document data to the second computing system via the communications interface.

8. The apparatus of claim 1, wherein:
the at least one processor is further configured to perform operations that provision the instantiated virtual machine with the object information and the elements of processing logic, the object information comprising information that characterizes an application model associated with the executed application program, and the application model characterizing the interface element of the graphical interface of the executed application program; and
the executed virtual machine performs operations consistent with the application model that access the graphical interface of the executed application program and request, through the accessed graphical interface, the first data associated with the customer identifier.

9. The apparatus of claim 1, wherein:
the template data comprises an element of digital content, an element of placeholder data, and formatting data; and
the at least one processor is further configured to:
  obtain at least one of a branch identifier, a portion of scheduling data, or an element of aggregated customer profile data, customer account data, or customer reporting data associated with the appointment; and perform operations that replace, within the template data, the element of placeholder data with the at least one of the branch identifier, the portion of scheduling data, or the element of aggregated customer profile data, customer account data, or customer reporting data;

generate the populated template data to further include the at least one of the branch identifier, the portion of scheduling data, or the element of aggregated customer profile data, customer account data, or customer reporting data; and generate the guidance document based on the populated template data and the formatting data.

10. The apparatus of claim 1, wherein:

the object information comprises a type of the interface element and at least a structure or format of the input data; and the executed virtual machine performs additional operations that generate the input data based on the object information and that provision the generated input data to the interface element of the graphical interface via the communications interface.

11. The apparatus of claim 1, wherein the executed virtual machine performs additional operations that, via the communications interface, receive the first data from the first computing system.

12. The apparatus of claim 1, wherein the executed virtual machine performs the operations that access the graphical interface, that generate the input data for the interface elements, that provision the input data to the interface element, and that request first data associated with the customer identifier without exposure to an application programming interface associated with the application program executed by the first computing system.

13. The apparatus of claim 1, wherein the at least one processor is further configured to execute the instructions to provision the processing logic to the virtual machine.

14. A computer-implemented method, comprising:

obtaining, using at least one processor, an element of appointment data associated with an appointment, the element of appointment data comprising a customer identifier;

using the at least one processor, performing operations that instantiate a virtual machine, that provision the instantiated virtual machine with object information characterizing an interface element of a graphical interface of an application program executed by a first computing system, and that execute at least one software robot on the virtual machine in accordance with elements of processing logic specifying an interaction between the at least one software robot and the graphical interface, the object information comprising a type of the interface element and at least a structure or format of the input data, and the at least one software robot executed on the virtual machine performing operations that:

(i) access programmatically, via the communications interface, the graphical interface of the application program executed by the first computing system;

(ii) generate input data for the interface element based on the object information, and provision the input data to the interface element of the graphical interface accessed programmatically via the communications interface, the input data having a structure or format consistent with the object information; and (iii) based on the input data, request, via the communications interface through the graphical interface accessed programmatically, first data associated with the customer identifier;

using the at least one processor, receiving the first data from the first computing system via a communications interface;

loading, from a data repository using the at least one processor, template data comprising at least one element of digital content, a first element of placeholder data that references a portion of the first data, and formatting data;

replacing, using the at least one processor, the first element of placeholder data with the portion of the first data;

using the at least one processor, generating populated template data that includes the at least one element of digital content and the portion of the first data, and generating a guidance document that includes the populated template data in accordance with the formatting data; and performing operations, using the at least one processor, that encrypt a data file comprising the guidance document using a public cryptographic key associated with a second computing system, and transmitting, using the at least one processor, the encrypted data file to the second computing system associated with the appointment.

15. The computer-implemented method of claim 14, wherein:

the computer-implemented method further comprises:

using the at least one processor, performing operations that (i) access a graphical interface of an application program executed by at least one second computing system, and (ii) request, through the accessed graphical interface, second data associated with the customer identifier;

receiving, using the at least one processor, the second data from the at least one second computing system via the communications interface; and the template data further comprises second elements of placeholder data, each of the second elements of placeholder data identifying a corresponding portion of the second data.

16. The computer-implemented method of claim 15, further comprising:

replacing, using the at least one processor, each of the second elements of placeholder data with the corresponding portion of the second data;

generating, using the at least one processor, additional populated template data that includes the at least one element of digital content, the portion of the first data, and the corresponding portions of the second data; and generating, using the at least one processor, the guidance document based on the populated template data, the additional populated template data, and the formatting data.

17. The computer-implemented method of claim 14, wherein the first data comprises at least one of profile, account, or reporting data associated with the customer identifier.

18. The computer-implemented method of claim 14, further comprising:

obtaining, using the at least one processor, one or more additional elements of appointment data, each of the additional elements of appointment data being associated with an additional appointment and comprising an additional customer identifier;

using the at least one processor, performing operations that, for each of the additional elements of appointment data: access the graphical interface of the executed application program; request, through the accessed graphical interface, second data associated with each of the additional customer identifiers; and receive the requested second data from the first computing system; and using the at least one processor, generating additional guidance documents for each of the additional appointment data elements based on the second data, and storing the additional guidance documents within a data repository.

19. The computer-implemented method of claim 18, further comprising:

identifying, using the at least one processor, a subset of the additional guidance documents that are associated with the second computing system, and extract the identified subset of the additional guidance documents from a data repository generating, using the at least one processor, the data file that includes the guidance document and the identified subset of the additional guidance documents, and encrypting, using the at least one processor, the data file using the public cryptographic key of the second computing system; and transmitting, using the at least one processor, the encrypted data file to the second computing system.

20. The computer-implemented method of claim 14, wherein:

the computer-implemented method further comprises performing operations, using the at least one processor, that provision the instantiated virtual machine with the object information and the elements of processing logic, the object information comprising information that characterizes an application model associated with the executed application program, and the application model characterizing the interface element of the graphical interface of the executed application program; and the executed virtual machine performs operations consistent with the application model that access the graphical interface of the executed application program and request, through the accessed graphical interface, the first data associated with the customer identifier.

21. The computer-implemented method of claim 14, wherein at least one of additional elements of appointment data comprises information generated during a programmatic chatbot session.

22. A tangible, non-transitory computer-readable medium storing instructions that, when executed by at least one processor, cause the at least one processor to perform a method, comprising:

obtaining an element of appointment data associated with an appointment, the element of appointment data comprising a customer identifier;

performing operations that instantiate a virtual machine, that provision the instantiated virtual machine with object information characterizing an interface element of a graphical interface of an application program executed by a first computing system, and that execute at least one software robot on the virtual machine in accordance with elements of processing logic specifying an interaction between the at least one software robot and the graphical interface of the application program executed by the first computing system, the object information comprising a type of the interface element and at least a structure or format of the input data, and the executed virtual machine performing operations that: (i) access programmatically, via the communications interface, the graphical interface of the application program executed by the first computing system; (ii) generate input data for the interface element based on the object information, and provision the input data to the interface element of the graphical interface programmatically accessed via the communications interface, the input data having a structure or format consistent with the object information; and (iii) based on the input data, request, via the communications interface through the graphical interface programmatically accessed, first data associated with the customer identifier;

receiving the first data from the first computing system via the communications interface;

obtaining template data comprising at least one element of digital content, a first element of placeholder data that references a portion of the first data, and formatting data;

replacing the first element of placeholder data with the portion of the first data;

generating populated template data comprising the at least one element of digital content and the portion the first data, and generating a guidance document that includes the populated template data in accordance with the formatted data; and performing operations that encrypt a data file comprising the guidance document using a public cryptographic key associated with a second computing system, and transmit, via the communications interface, the encrypted data file to the second computing system associated with the appointment.

* * * * *